(12) United States Patent
Kolb et al.

(10) Patent No.: US 10,206,040 B2
(45) Date of Patent: *Feb. 12, 2019

(54) MICROPHONE ARRAY FOR GENERATING VIRTUAL SOUND FIELD

(71) Applicant: Essential Products, Inc., Palo Alto, CA (US)

(72) Inventors: Michael Kolb, Redwood City, CA (US); Xinrui Jiang, San Jose, CA (US); Andrew E. Rubin, Los Altos, CA (US); Matthew Hershenson, Los Altos, CA (US); Xiaoyu Miao, Palo Alto, CA (US); Joseph Anthony Tate, San Jose, CA (US); Jason Sean Gagne-Keats, Cupertino, CA (US); David John Evans, V, Palo Alto, CA (US); Rebecca Schultz Zavin, Portola Valley, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/649,640

(22) Filed: Jul. 13, 2017

(65) Prior Publication Data
US 2017/0311080 A1 Oct. 26, 2017

Related U.S. Application Data

(63) Continuation-in-part of application No. 15/336,588, filed on Oct. 27, 2016, now Pat. No. 9,819,865.
(Continued)

(51) Int. Cl.
*H04R 3/00* (2006.01)
*H04R 5/027* (2006.01)
(Continued)

(52) U.S. Cl.
CPC ....... *H04R 5/027* (2013.01); *G06F 17/30247* (2013.01); *G06F 17/30265* (2013.01);
(Continued)

(58) Field of Classification Search
None
See application file for complete search history.

(56) References Cited

U.S. PATENT DOCUMENTS 5,912,976 A * 6/1999 Klayman ................ H04S 3/002
381/1
9,467,793 B2 * 10/2016 Strub .................... G10L 19/008
(Continued)

OTHER PUBLICATIONS

International Search Report and Written Opinion dated May 21, 2018 in International Patent Application No. PCT/US2018/019820, 16 pages.

*Primary Examiner* — Reza Aghevli
(74) *Attorney, Agent, or Firm* — Perkins Coie LLP

(57) ABSTRACT

Certain aspects of the technology disclosed herein include generating a virtual sound field based on data from an ambisonic recording device. The ambisonic device records sound of a surrounding environment using at least four microphones having a tetrahedral orientation. An omnidirectional microphone having an audio-isolated portion can be used to isolate sound from a particular direction. Sound received from the plurality of microphones can be used to generate a virtual sound field. The virtual sound field include a dataset indicating a pressure signal and a plurality of velocity vectors. The ambisonic recording device can include a wide angle camera and generate wide angle video corresponding to the virtual sound field.

17 Claims, 20 Drawing Sheets

Related U.S. Application Data

(60) Provisional application No. 62/464,361, filed on Feb. 27, 2017, provisional application No. 62/380,201, filed on Aug. 26, 2016, provisional application No. 62/325,922, filed on Apr. 21, 2016, provisional application No. 62/300,631, filed on Feb. 26, 2016, provisional application No. 62/249,130, filed on Oct. 30, 2015.

(51) Int. Cl.
| | | |
|---|---|---|
| *H04N 5/77* | (2006.01) | |
| *H04N 5/247* | (2006.01) | |
| *H04N 5/232* | (2006.01) | |
| *G11B 20/00* | (2006.01) | |
| *G06T 5/00* | (2006.01) | |
| *G06T 11/60* | (2006.01) | |
| *H04R 1/40* | (2006.01) | |
| *H04R 1/34* | (2006.01) | |
| *H04S 7/00* | (2006.01) | |
| *G06F 17/30* | (2006.01) | |
| *H04N 5/225* | (2006.01) | |
| *G06T 7/33* | (2017.01) | |
| *G06F 21/60* | (2013.01) | |

(52) U.S. Cl.
CPC .. *G06F 17/30268* (2013.01); *G06F 17/30743* (2013.01); *G06T 5/006* (2013.01); *G06T 7/33* (2017.01); *G06T 11/60* (2013.01); *G11B 20/00992* (2013.01); *H04N 5/2254* (2013.01); *H04N 5/2258* (2013.01); *H04N 5/23238* (2013.01); *H04N 5/23293* (2013.01); *H04N 5/247* (2013.01); *H04N 5/77* (2013.01); *H04R 1/342* (2013.01); *H04R 1/406* (2013.01); *H04R 3/005* (2013.01); *H04S 7/30* (2013.01); *G06F 21/602* (2013.01); *G06T 2200/32* (2013.01); *G06T 2207/10012* (2013.01); *G06T 2207/20221* (2013.01); *H04S 2400/15* (2013.01); *H04S 2420/11* (2013.01)

(56) References Cited

U.S. PATENT DOCUMENTS

| | | | |
|---|---|---|---|
| 9,501,683 B1* | 11/2016 | Hatstat | G06K 7/1491 |
| 9,563,278 B2* | 2/2017 | Xiang | G06F 3/167 |
| 2007/0036364 A1* | 2/2007 | Okuno | H04R 29/00 381/59 |
| 2007/0237340 A1 | 10/2007 | Pfanzagl-Cardone | |
| 2008/0199034 A1 | 8/2008 | Zhang et al. | |
| 2011/0273449 A1* | 11/2011 | Kiuchi | G09G 3/2022 345/426 |
| 2013/0058492 A1* | 3/2013 | Silzle | H04R 5/027 381/59 |
| 2013/0142341 A1* | 6/2013 | Del Galdo | G10L 19/008 381/23 |
| 2013/0268280 A1* | 10/2013 | Del Galdo | G10L 19/02 704/500 |
| 2013/0278631 A1* | 10/2013 | Border | G02B 27/017 345/633 |
| 2014/0079238 A1 | 3/2014 | Bastide et al. | |
| 2014/0180684 A1* | 6/2014 | Strub | G10L 19/008 704/211 |
| 2014/0198918 A1* | 7/2014 | Li | H04S 7/30 381/26 |
| 2014/0307894 A1 | 10/2014 | Kordon et al. | |
| 2015/0036848 A1* | 2/2015 | Donaldson | H04S 7/303 381/303 |
| 2015/0055937 A1 | 2/2015 | Van Hoff et al. | |
| 2015/0208156 A1* | 7/2015 | Virolainen | H04S 7/303 381/92 |
| 2015/0208166 A1* | 7/2015 | Raghuvanshi | H04R 3/002 381/71.6 |
| 2015/0332123 A1* | 11/2015 | Reibman | G06K 9/6215 382/190 |
| 2015/0363641 A1* | 12/2015 | Navulur | G06K 9/00476 382/113 |
| 2016/0099009 A1* | 4/2016 | Kim | H04S 7/305 381/17 |
| 2016/0316182 A1* | 10/2016 | Kato | H04N 9/3111 |
| 2017/0034623 A1* | 2/2017 | Christoph | H04R 5/027 |
| 2017/0034642 A1* | 2/2017 | Takahashi | G10K 15/00 |
| 2017/0094420 A1* | 3/2017 | Boldt | H04R 25/405 |
| 2017/0127035 A1* | 5/2017 | Kon | H04N 5/64 |
| 2017/0311080 A1 | 10/2017 | Kolb et al. | |

\* cited by examiner

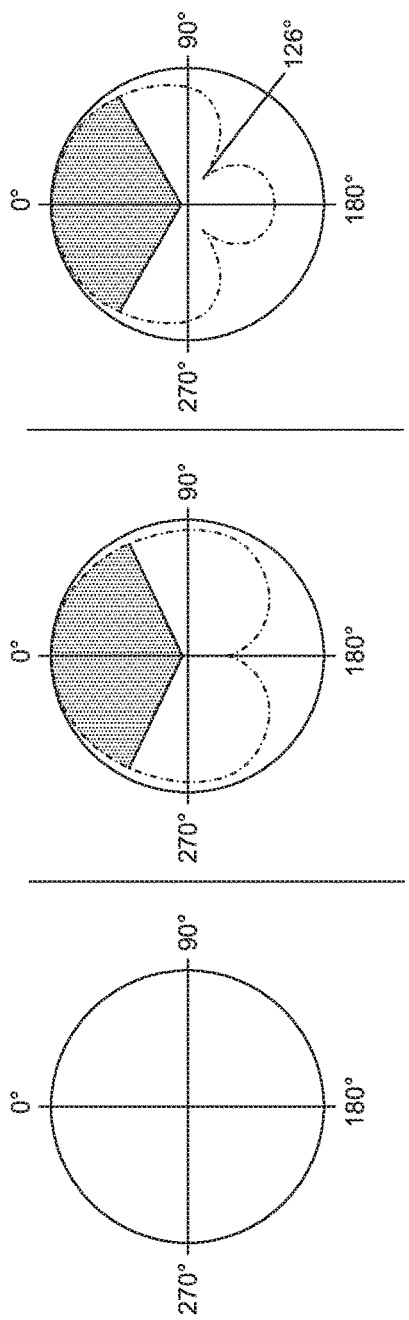
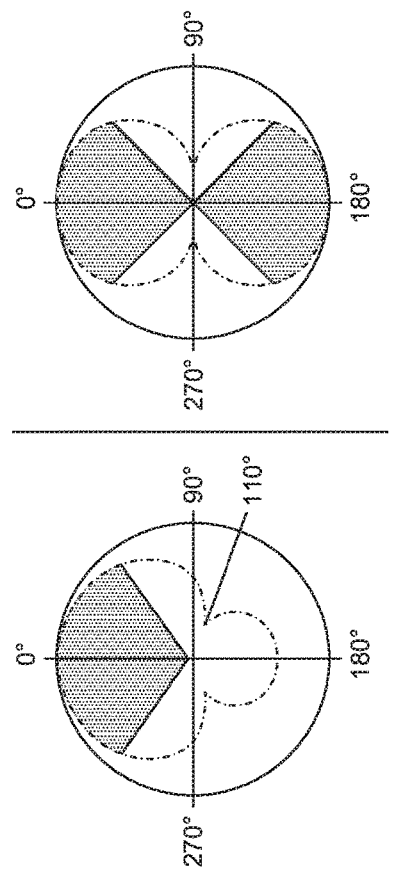
FIG. 3A
FIG. 3B
FIG. 3C
FIG. 3D
FIG. 3E

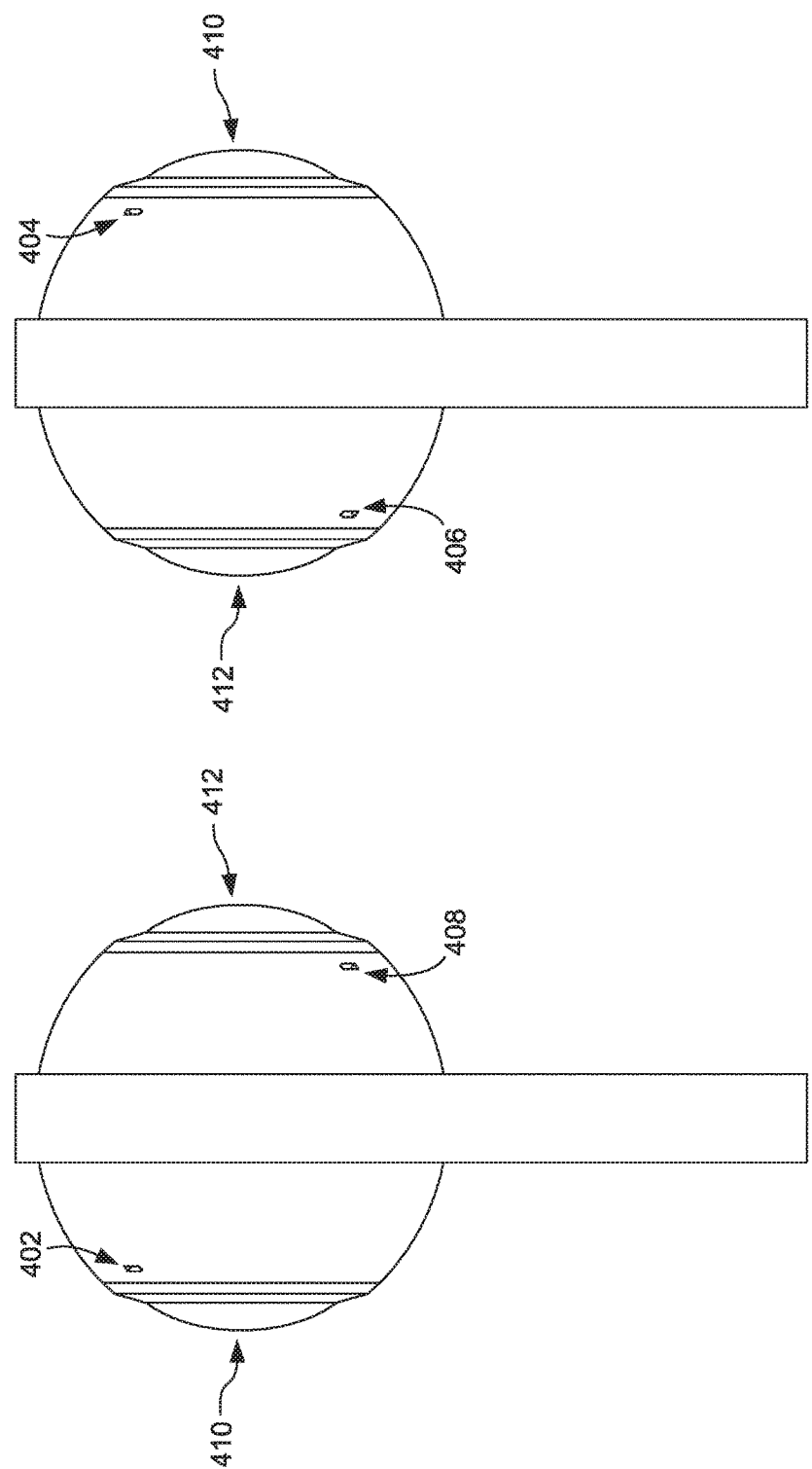

MICROPHONE ARRAY FOR GENERATING VIRTUAL SOUND FIELD

CROSS REFERENCE TO RELATED APPLICATIONS

This application claims priority to U.S. Provisional Patent Application Ser. No. 62/464,361, filed Feb. 27, 2017, and U.S. Provisional Patent Application Ser. No. 62/380,201, filed Aug. 26, 2016, and is a continuation-in-part of U.S. application Ser. No. 15/336,588, filed Oct. 27, 2016, which claims priority to U.S. Provisional Patent Application Ser. No. 62/325,922, filed Apr. 21, 2016, U.S. Provisional Patent Application Ser. No. 62/300,631, filed Feb. 26, 2016, and U.S. Provisional Patent Application Ser. No. 62/249,130, filed Oct. 30, 2015, all of which are incorporated herein by reference in their entirety.

TECHNICAL FIELD

The present application is related to audio processing, and more specifically to an apparatus and method for capturing sound from a surrounding environment and generating a virtual representation of a sound field.

BACKGROUND

Conventional microphones include a transducer that converts sound into an electrical signal. Most microphones use electromagnetic induction, capacitance change, or piezoelectricity to produce an electrical signal from air pressure variations. Microphones typically need to be connected to a preamplifier before the signal can be recorded or reproduced.

A microphone can be configured to detect sound from different directions (i.e. have different polar patterns). Some microphones are omnidirectional, meaning that sound can be detected from any direction. However, conventional omnidirectional microphones cannot isolate sound from a particular direction. Unidirectional microphones are sensitive to sound from only one direction. However, use of unidirectional microphones may be cost prohibitive in consumer products.

BRIEF DESCRIPTION OF THE DRAWINGS

FIGS. 3A-3E illustrate polar patterns for various microphone types, according to an embodiment.

FIGS. 4A-4B illustrate a microphone array integrated into an imaging device, according to another embodiment.

DETAILED DESCRIPTION

Figure 1:
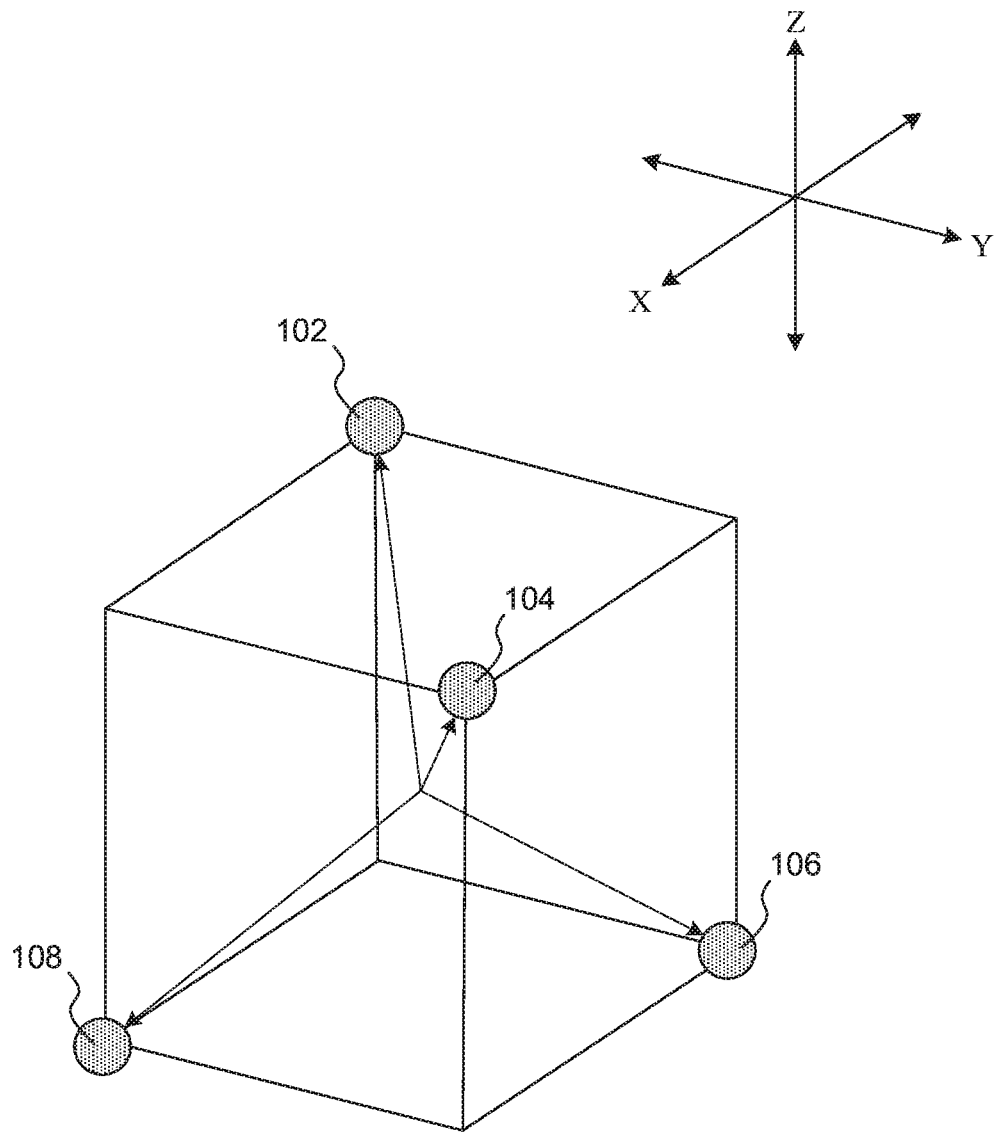
FIG. 1 illustrates a spatial arrangement of a plurality of microphones in a microphone array, according to an embodiment.

Ambisonics is a full-sphere surround sound technique. Ambisonics involves receiving sound from along a horizontal plane as well as a vertical plane such that sound from above, below, in front, behind, to a left, and to a right of a device is captured by an ambisonic device. Conventional ambisonics uses unidirectional microphones (e.g., subcardiod or cardiod microphone) to capture sound from particular directions from each microphone. However, using unidirectional microphones in ambisonics is not practical and has not been a commercial success.

Certain aspects of the technology disclosed herein include using an omnidirectional microphone in an ambisonic apparatus. An omnidirectional microphone provides many performance advantages over a unidirectional microphone including, for example, having a lower gain to feedback ratio, less feedback build-up, smooth and even off-axis coloration, less wind noise, less popping from plosive sounds, no bass build up due to proximity effect, less handling and vibration noise, and is less likely to dampen audio outside of the polar pattern.

The disclosed technology involves an ambisonic recording device configured to record sound of a surrounding environment. The ambisonic recording device comprises at least four microphones having a particular orientation around the ambisonic recording device. The microphones are positioned such that sound from a different region is received by each microphone. Sound can be received by the microphones from every direction in a three-dimensional environment. A microphone of a plurality of microphones can isolate sound from a particular direction. An omnidirectional microphone having an audio-isolated portion can be used to isolate sound from a particular direction.

Sound received from the plurality of microphones can be used to generate a virtual sound field. The virtual sound field can be a dataset including sound information associated with a plurality of directions around the ambisonic recording device. A pressure signal and direction of each microphone of the plurality of microphones can be used to generate the virtual sound field.

In an embodiment, the microphone array apparatus can be combined with a wide angle camera to generate wide angle video corresponding to the virtual sound field. The wide angle camera can include a single wide angle lens or a plurality of lenses. The wide angle camera can capture images of the surrounding environment up to 360 degrees around the camera. Images captured from various lenses of the plurality of lenses can be stitched together to generate a wide angle image of the surrounding environment.

In an embodiment, a wide angle image can be combined with the generated sound field of the surrounding environment. A combined wide angle image and virtual sound field includes images and audio associated with various orientations of the surrounding environment. For example, portions of the wide angle image can be displayed and audio associated with the portions of the image can be provided. In an example, a user can scroll to different orientations of an image and be provided sound associated with different orientations of the image. In another example, a predefined scrolling through various orientations of a wide view image can be provided while audio of a sound field corresponding to the various orientations of the wide view image is provided.

Terminology

Brief definitions of terms, abbreviations, and phrases used throughout this application are given below.

Reference in this specification to "wide angle audio" and "wide angle sound" includes both sound captured around a yaw axis, and sound captured around a pitch axis. Reference in this specification to "wide angle audio field" and "wide angle sound field" includes both audio obtained when a microphone collects sound around a yaw axis, and audio obtained when a microphone collects sound around a pitch axis.

Reference in this specification to "360° view" includes both a view obtained when a camera rotates 360° around a yaw axis, and a view obtained when the camera rotates 360° around a pitch axis. Reference in this specification to "360° image" includes both an image obtained when a camera rotates 360° around a yaw axis, and an image obtained when the camera rotates 360° around a pitch axis.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

FIG. 1 shows a spatial arrangement of a plurality of microphones in a microphone array, according to one embodiment. The plurality of microphones include a microphone 102, microphone 104, microphone 106, and microphone 108. The plurality of microphones can be in a tetrahedral arrangement as shown. Although the tetrahedral arrangement is shown in a cube, it is referred to as the tetrahedral arrangement because planes connecting the plurality of microphones within the cube create a tetrahedron. The tetrahedral arrangement includes one of the microphone 102, microphone 104, microphone 106, and microphone 108 at each corner of the tetrahedron.

The plurality of microphones receive sound from a wide angle audio field (e.g., full-sphere surround sound). The sound recorded by the plurality of microphones consists of independent recordings from each of the plurality of microphones. For example, the independent recordings can include four recordings ($R_{102}$, $R_{104}$, $R_{106}$, and $R_{108}$) from four microphones (e.g., microphone 102, microphone 104, microphone 106, and microphone 108).

The plurality of independent recordings (e.g., $R_{102}$, $R_{104}$, $R_{106}$, and $R_{108}$) recorded by the plurality of microphones can be manipulated to, for example, identify sound pressure level and velocity along a plurality of directions of propagation of the sound. A sound pressure level (W) at a given point in space as well as three components of a velocity vector (X, Y, and Z) can be determined based on the plurality of independent recordings (e.g., $R_{102}$, $R_{104}$, $R_{106}$, and $R_{108}$) associated with the plurality of microphones (e.g., microphone 102, microphone 104, microphone 106, and microphone 108) having a known spatial orientation. The plurality of independent recordings (e.g., $R_{102}$, $R_{104}$, $R_{106}$, and $R_{108}$) can be recordings associated with each microphone stored on a non-transitory storage medium or a source sound signal generated by each of the microphones upon receiving a sound input.

First order ambisonics can be described as a B-format signal including a truncated spherical harmonic decomposition of the sound field. A first-order B-format includes a sound pressure (W) and the three components of the velocity vector (XYZ) at a point in space. The sound pressure and the velocity vectors describe the sound field on a sphere around a microphone device. A sound pressure level (W) can be determined by calculating a sum of the sound pressure level for each of the plurality of independent recordings (e.g., $R_{102}$, $R_{104}$, $R_{106}$, and $R_{108}$). For example, the following equation can be used to determine the sound pressure level (W):

$$W = R_{102} + R_{104} + R_{106} + R_{108}$$

In addition, the three components of the velocity vector (X, Y, and Z) can be calculated using the following equation:

$$X = \Sigma R_n (\cos \Theta)(\cos \theta)$$

$$Y = \Sigma R_n (\sin \Theta)(\cos \theta)$$

$$Z = \Sigma R_n (\sin \theta)$$

Each microphone is associated with a position having a horizontal angle ($\Theta$) and a vertical angle ($\theta$). Recordings or sound signals generated by each of the microphones can be isolated to a particular velocity vector in space by using the above equation to sum the recordings with respect to their angular position. For example, the velocity vectors X, Y, and Z can be calculated for recordings $R_{102}$, $R_{104}$, $R_{106}$, and $R_{108}$ as follows:

$$X = R_{102}(\cos \Theta)(\cos \theta) + R_{104}(\cos \Theta)(\cos \theta) + R_{106}(\cos \Theta)(\cos \theta) + R_{108}(\cos \Theta)(\cos \theta)$$

$$Y = R_{102}(\sin \Theta)(\cos \theta) + R_{104}(\sin \Theta)(\cos \theta) + R_{106}(\sin \Theta)(\cos \theta) + R_{108}(\sin \Theta)(\cos \theta)$$

$$Z = R_{102}(\sin \theta) + R_{104}(\sin \theta) + R_{106}(\sin \theta) + R_{108}(\sin \theta)$$

These equations can be simplified for an arrangement based on the horizontal angle ($\Theta$) and the vertical angle ($\theta$) of each microphone. The depicted tetrahedral arrangement of microphone 102, microphone 104, microphone 106, and microphone 108 can be simplified by plugging in the horizontal angle ($\Theta$) and the vertical angle ($\theta$) with respect to each microphone into each of the equations. Microphones 102 and 106 lie in a positive region with respect to the X velocity vector resulting in a positive $R_{102}$ and $R_{106}$ whereas microphones 104 and 108 lie in a negative region with respect to the X velocity vector resulting in a negative $R_{104}$ and $R_{108}$. Microphones 102 and 108 lie in a positive region with respect to the Y velocity vector resulting in a positive $R_{102}$ and $R_{108}$ whereas microphones 104 and 106 lie in a negative region with respect to the Y velocity vector resulting in a negative $R_{104}$ and $R_{108}$. Microphones 102 and 104 lie in a positive region with respect to the Z velocity vector resulting in a positive $R_{102}$ and $R_{104}$ whereas microphones 106 and 108 lie in a negative region with respect to the Z velocity vector resulting in a positive $R_{106}$ and $R_{108}$. The simplified equations that result from the depicted arrangement are provided below:

$$X = R_{102} - R_{104} + R_{106} - R_{108}$$

$$Y = R_{102} - R_{104} - R_{106} + R_{108}$$

$$Z = R_{102} + R_{104} - R_{106} - R_{108}$$

The simplified equations above can be used to determine velocity vectors X, Y, and Z for the tetrahedral arrangement. For example, A-format microphone signals (e.g., $R_{102}$, $R_{104}$, $R_{106}$, and $R_{108}$) can be received from each of the microphones and converted into velocity vectors used in a virtual sound field. A virtual sound field is produced based on the velocity vectors.

The virtual sound field includes sound data associated with various positions surrounding the microphone. For example, a first set of sound data can be associated with a first position where the first position is any direction between velocity vectors. A second set of sound data can be associated with a second position where the second position is approximately opposite of the first position. For example, the first position can be associated with a one side of a headphone and a second position can be associated with a second side of a headphone. The first and second positions can change relative to the velocity vectors if motion data detects movement of a user. For example, motion sensors can detect a user rotationally turning his/her head to the left and the first and second positions can be shifted to the left in accordance with the detected user movement.

Figure 2:
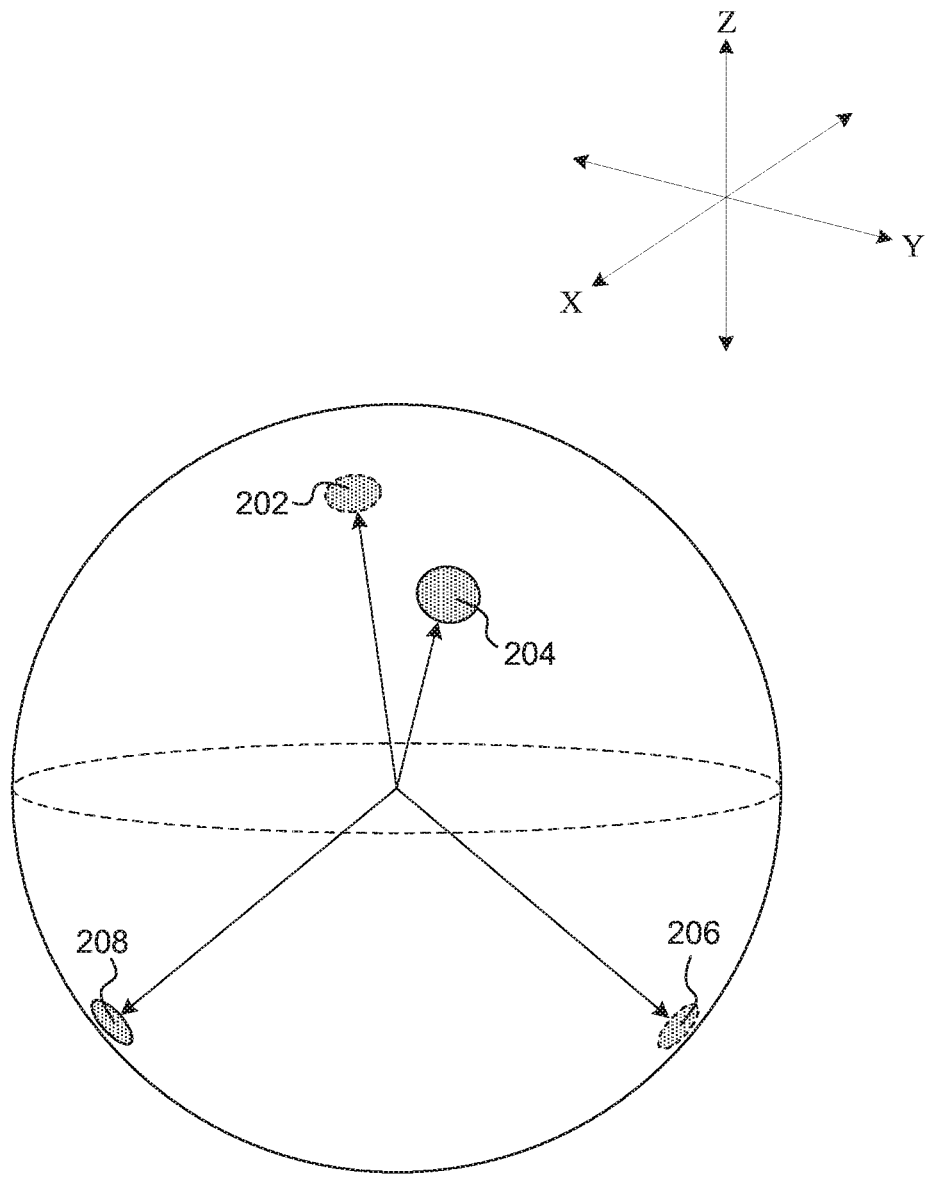
FIG. 2 illustrates a microphone array apparatus having the spatial arrangement of the plurality of microphones, according to an embodiment.

FIG. 2 shows a microphone array apparatus having a plurality of microphones in a tetrahedral arrangement, according to one embodiment. The plurality of microphones include a microphone 202, microphone 204, microphone 206, and microphone 208. The plurality of microphones can correspond to the plurality of microphones of FIG. 1. Although the tetrahedral arrangement is shown in a sphere, it is referred to as the tetrahedral arrangement because planes connecting the plurality of microphones within the sphere create a tetrahedron. The tetrahedral arrangement includes one of the microphone 202, microphone 204, microphone 206, and microphone 208 at each corner of the tetrahedron.

The plurality of microphones can each receive sound and convert received sound into A-format microphone signals. As discussed in FIG. 1, the A-format microphone signals can be converted into velocity vectors accounting for the geometric arrangement of the plurality of microphones. Converting microphone signals into velocity vectors includes, for example, eliminating sounds corresponding to a direction opposite of a direction of the velocity vector, reducing sounds corresponding to a direction other than the velocity vector in accordance with a degree difference. A sound corresponding to an opposite direction of a velocity vector not included in the velocity vector. A greater degree to which a direction of a sound deviates from a direction of the velocity vector, the more the sound is reduced. A greater degree to which a direction of a sound corresponds to a direction of the velocity vector, the greater the sound intensity included in the velocity vector. Thus, by eliminating or reducing sounds corresponding to directions other than a direction of the velocity vector according to a degree of difference of the direction corresponding to the sound and a direction of the velocity vector, the velocity vector includes sound corresponding to a particular direction.

Embodiments include calculating at least three velocity vectors for an X, Y, and Z direction. Embodiments include calculating more than three velocity vectors. Embodiments include a velocity vector being calculated for a particular direction in response to a query. For instance, headphones having a motion sensing device detecting an orientation of a user can provide the detected orientation which can be associated with a particular direction of a velocity vector. A velocity vector having the particular direction corresponding to the detected orientation of the headphones can be transmitted to the headphones. Real-time velocity vector determinations can be used to provide a three-dimensional sound experience for a user.

FIGS. 3A-E show illustrations of polar patterns for various microphone types, according to one embodiment. FIG. 3A shows an omnidirectional polar pattern. An omnidirectional microphone's response is approximately a sphere in three dimensions. FIG. 3B shows a cardioid polar pattern. A cardioid microphone is a type of unidirectional microphone that reduces sound from the side and rear. FIG. 3C shows an super-cardioid polar pattern. A super-cardioid microphone is similar to a cardioid with a slight bi-directional sound contribution and having null regions at approximately 126 degrees. FIG. 3D shows an hyper-cardioid polar pattern. A hyper-cardioid microphone is similar to a super-cardioid microphone except with less front sound and slightly more rear sound sensitivity and having null regions at approximately 110 degrees. FIG. 3E shows an bi-directional (also referred to as figure 8) polar pattern. A bi-directional microphone receives sound equally from both the from and back (e.g., a ribbon microphone).

Conventional omnidirectional microphones cannot isolate sound from a particular direction. Omnidirectional microphones are not conventionally used in a multi-microphone arrangement due to leakage resulting from sound seeping in from undesirable directions. However, an omnidirectional microphone provides many performance advantages over a unidirectional microphone including, for example, having a lower gain to feedback ratio, less feedback build-up, smooth and even off-axis coloration, less wind noise, less popping from plosive sounds, no bass build up due to proximity effect, less handling and vibration noise, and is less likely to dampen audio outside of the polar pattern.

Embodiments include acoustic shielding a portion of an omnidirectional microphone to reduce undesirable sound leakage in a multi-microphone arrangement while exploiting performance advantages of an omnidirectional microphone. The portion of the omnidirectional microphone can be shielded by using an acoustic insulator and/or an acoustic reflector.

An acoustic insulator can encase a portion of the omnidirectional microphone and/or encase a portion of a multi-microphone device to impede sounds of various frequencies. The acoustic insulation is composed of an acoustically insulating material. The acoustically insulating material can be a porous material, such as, for example, porous ceramic, porous concrete, foam (e.g., open cell rubber or melamine foam), fabric (e.g., cotton fiber), or any combination of porous materials. More than one insulating material may be used to absorb sounds of different frequencies. For example, a porous open cell foam can be used to absorb medium and high frequencies in combination with cotton fiber to absorb low frequencies.

An acoustic reflector can encase a portion of the omnidirectional microphone and/or encase a portion of a multi-microphone device. An acoustic reflector can be composed of a solid material, such as, for example, a metal, plastic, etc. The acoustic reflector can encase the multi-microphone device having an opening for each microphone and a sound-proof or sound-resistant seal affixing each microphone to the acoustic reflector. Another acoustic reflector can encase an inner portion of each omnidirectional microphone. The inner acoustic reflector can reflect sound that may enter the multi-microphone device, thus further acoustically isolating an inner portion of the omnidirectional microphone.

FIGS. 4A-4B show a profile view of a microphone array integrated into an imaging device, according to another embodiment. An imaging device can record a wide field of view of an environment in tandem with the microphone array recording sound from the environment, according to one embodiment. The recorded wide field of view can be used to generate an image field, as described below with reference to FIG. 11. The recorded sound can be used to generate a virtual sound field. The virtual sound field can be merged with an integrated image of a surrounding environment by mapping the virtual sound field to the integrated image or mapping the integrated image to the virtual sound field.

The microphone array is arranged such that each microphone faces a different direction. In an embodiment, four microphones (e.g., microphones 402, 404, 406, and 408) can be positioned in the tetrahedral arrangement discussed above with respect to FIG. 1.

The microphone array can be disposed around an imaging device include one or more cameras (e.g., camera 410 and camera 412). Although an imaging device having two cameras positioned in opposite directions is shown, various numbers and arrangements of cameras are contemplated. In an embodiment, the imaging device can include an array of cameras. An array of cameras can receive a plurality of light beams from a wide angle view (e.g., a 360° view). The curved three-dimensional surface can take on any shape, such as an ellipsoid, a spheroid, a sphere, a cube with rounded edges, or any three-dimensional shape. Some shapes, for example, a shape with sharp edges or concave surfaces, may hinder certain viewing angles. Preferred embodiments include shapes with no sharp edges or concave surfaces.

The cameras can substantially cover the curved three-dimensional surface. The cameras can be disposed on the curved three-dimensional surface in a variety of ways: the cameras can be uniformly distributed on the curved three-dimensional surface; the cameras can be placed at the intersection of uniformly distributed longitude and latitude lines; the cameras can be more densely distributed in the areas of interest, for example, in the front facing region and/or the back facing region; etc. In an embodiment, camera density may be adjustable by enabling one or more cameras to move by, for example, including the one or more cameras on a track running along a length of the curved three-dimensional surface and mechanically connecting the one or more cameras to an actuator. Increasing camera distribution density may improve picture quality by focusing additional cameras on an area of interest, such as, for example, a detected facial impression.

The array of cameras can be disposed on a curved substrate. In one embodiment, the curved substrate matches the shape of the curved three-dimensional surface. In another embodiment, a plurality of curved substrates whose curvature does not match the curvature of the three-dimensional surface can be disposed to substantially cover the three-dimensional surface.

In another embodiment, the array of cameras is divided into smaller arrays of cameras, each smaller array of cameras disposed on a planar substrate. The size associated with each planar substrate is configured to be small compared to a curvature associated with the three-dimensional surface. The plurality of small arrays of cameras is placed on the curved three-dimensional surface to substantially cover the surface as described above.

Each camera can include a lens and a photo sensor. The lens receives a light beam and focuses the light beam on the photo sensor. The lens can be any type of lens, such as a ball lens, a wide angle lens, or a lens having a focal length between an extremely short and an extremely long focal length. The lens can be a small lens, such as a millimeter, micrometer, nanometer, picometer, etc., lens. The photo sensor can be a CMOS sensor, a CCD sensor, or any sensor configured to sense light.

A processor, connected to the array of photo sensors, receives a plurality of images corresponding to the array of photo sensors. The processor creates an image comprising a wide angle view (e.g., a 360° view) of an environment around the imaging device. The processor can be disposed inside the three-dimensional surface, or can be disposed outside the three-dimensional surface. The imaging device described here can be a standalone camera or can be part of another device, such as a mobile device, etc.

Figure 5B:
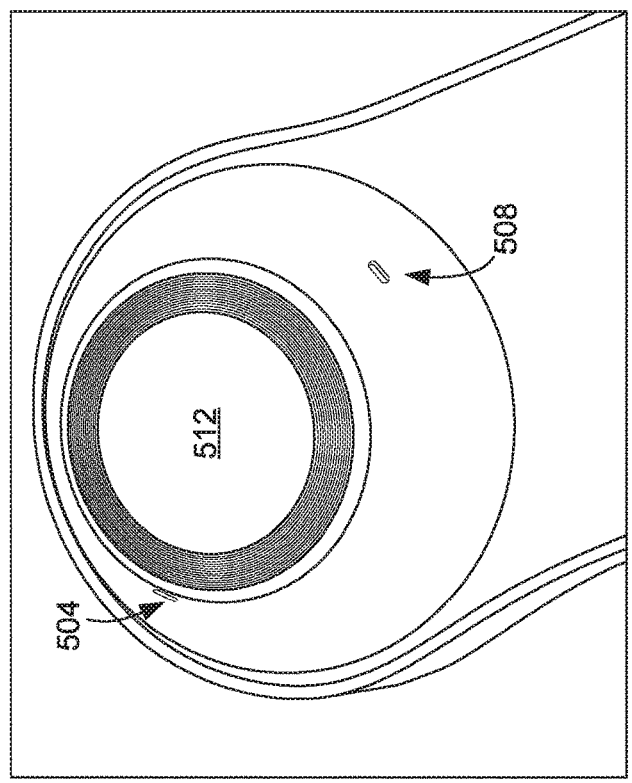
FIGS. 5A-5B illustrate a microphone array integrated into an imaging device, according to another embodiment.
Figure 5A:
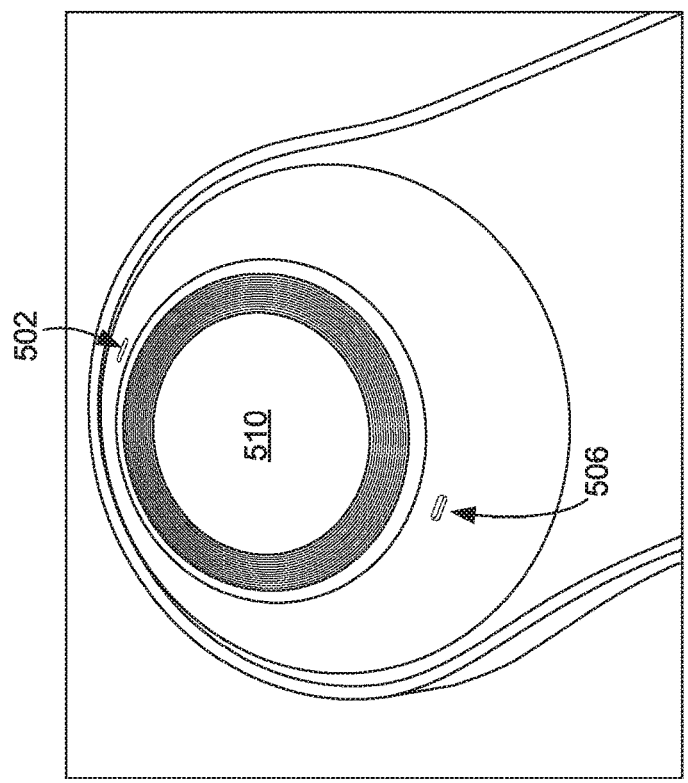

FIGS. 5A-5B show a front view and a back view of a microphone array integrated into an imaging device, according to another embodiment. The microphone array can include microphones 502, 504, 506, and 508 disposed in a tetrahedral arrangement. FIG. 5A shows a microphone in an upper right portion and a lower left portion of an enclosure, and FIG. 5B shows a microphone in an upper left portion and a lower right portion of the enclosure. Including microphones on opposite sides of the enclosure can enable the device to receive sound from every direction around the device.

As discussed above with respect to FIGS. 4A-4B, although an imaging device having two cameras positioned in opposite directions is shown, various numbers and arrangements of cameras are contemplated. For instance, the imaging device can include four cameras and four microphones where the cameras and microphones are both positioned in a tetrahedral arrangement to both capture images and capture sound surrounding the device.

Figure 6B:
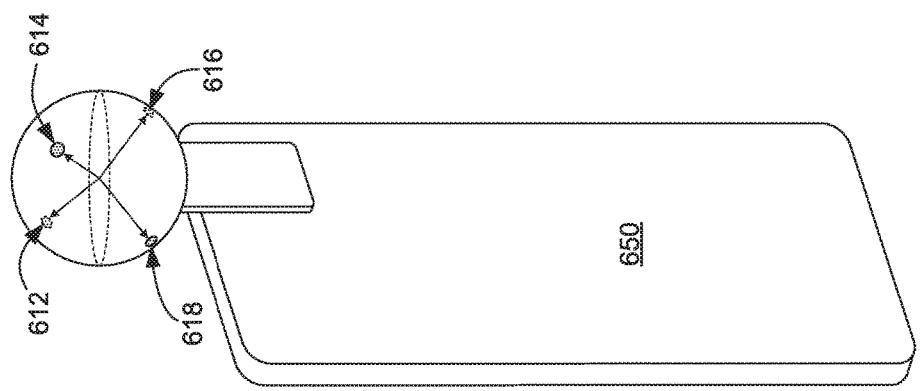
FIG. 6B illustrates a microphone array apparatus attached to a mobile device, according to an embodiment.
Figure 6A:
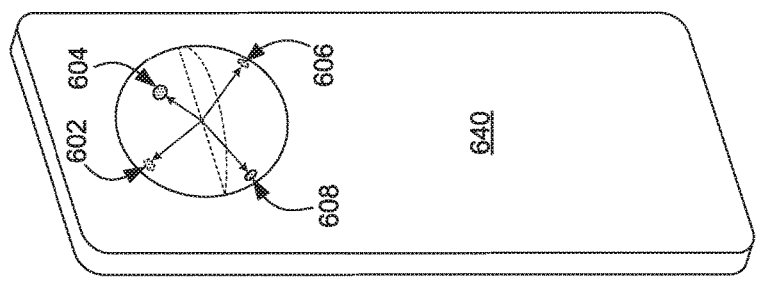
FIG. 6A illustrates a microphone array apparatus integrated into a mobile device, according to an embodiment.

FIGS. 6A-6B show a microphone array apparatus integrated into a mobile device 640 a microphone array apparatus attached to a mobile device 650, respectively, according to various embodiments. The microphone array apparatus can be built into the mobile device (e.g., as shown in FIG. 6A) or attachable to the mobile device (e.g., as shown in FIG. 6B). The built-in and/or attachable microphone device can include a plurality of microphones in a tetrahedral arrangement. FIG. 6A shows microphones 602, 604, 606, and 608 disposed in a tetrahedral arrangement. FIG. 6B shows microphones 612, 614, 616, and 618 disposed in a tetrahedral arrangement.

The microphone device can include one or more cameras to capture images while the plurality of microphones capture sound from a surrounding environment. In an embodiment, the microphone device can be substantially covered by image sensors configured to record images of a surrounding environment in every or nearly every direction around the microphone device. The cameras can include conventional lenses and/or wide-angle lenses.

Figure 7B:
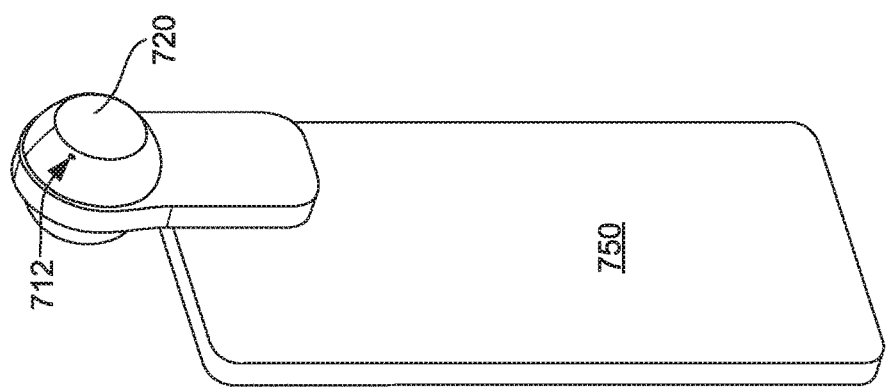
FIG. 7B illustrates a microphone array integrated into an imaging device attached to a mobile device, according to another embodiment.
Figure 7A:
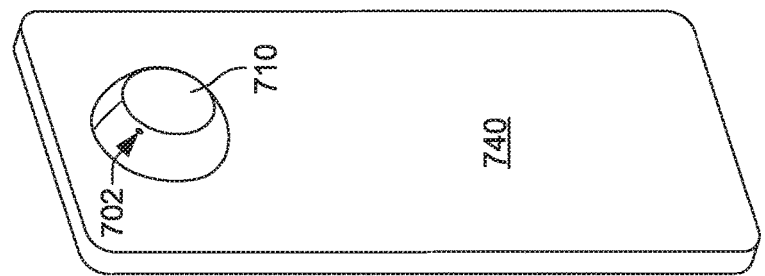
FIG. 7A illustrates a microphone array integrated into an imaging device of a mobile device, according to an embodiment.

FIGS. 7A-7B show a microphone array integrated into an imaging device of a mobile device and a microphone array integrated into an imaging device attachable to a mobile device, respectively, according to various embodiments. The microphone array apparatus can be built into the mobile device or attachable to the mobile device. The built-in and/or attachable microphone device can include a plurality of microphones in a tetrahedral arrangement. The microphone device can include one or more cameras to capture images while the plurality of microphones capture sound from a surrounding environment.

FIG. 7A shows a microphone array integrated into an imaging device of a mobile device 740. The microphone array includes microphone 702 as well as at least three additional microphones disposed adjacent to camera 710 and/or another camera on an opposite side of the mobile device 740. For example, two microphones can be disposed adjacent to camera 710 and tow microphones can be disposed adjacent to the another camera on a side of the mobile device 740 opposite of camera 710.

FIG. 7B shows a microphone array integrated into an accessory attachable to a mobile device 750. The accessory can include, for example, one or more cameras (e.g., camera 720) and the microphone array (e.g., microphone 712). In an embodiment, the accessory can include two fisheye cameras disposed in opposite directions. Two microphones can be disposed adjacent to each camera. Four microphones adjacent to the two cameras can be disposed in a tetrahedral arrangement.

The accessory can attach to the mobile device 750 via an attachment mechanism. The attachment mechanism can include, for example, a magnet, a clip, a threaded fastener, a snap fastener, a clasp, a clamp, a pin, a grommet, a detachable rivet, a hook and look fastener, or any combination thereof. One fastener combination can include one or more magnetic rivets insertable into an opening of the mobile device 750. The one or more magnetic rivets can be decoupled by applying a force to the accessory greater than the magnetic force holding the accessory in the one or more openings of the mobile device 750.

Figure 8:
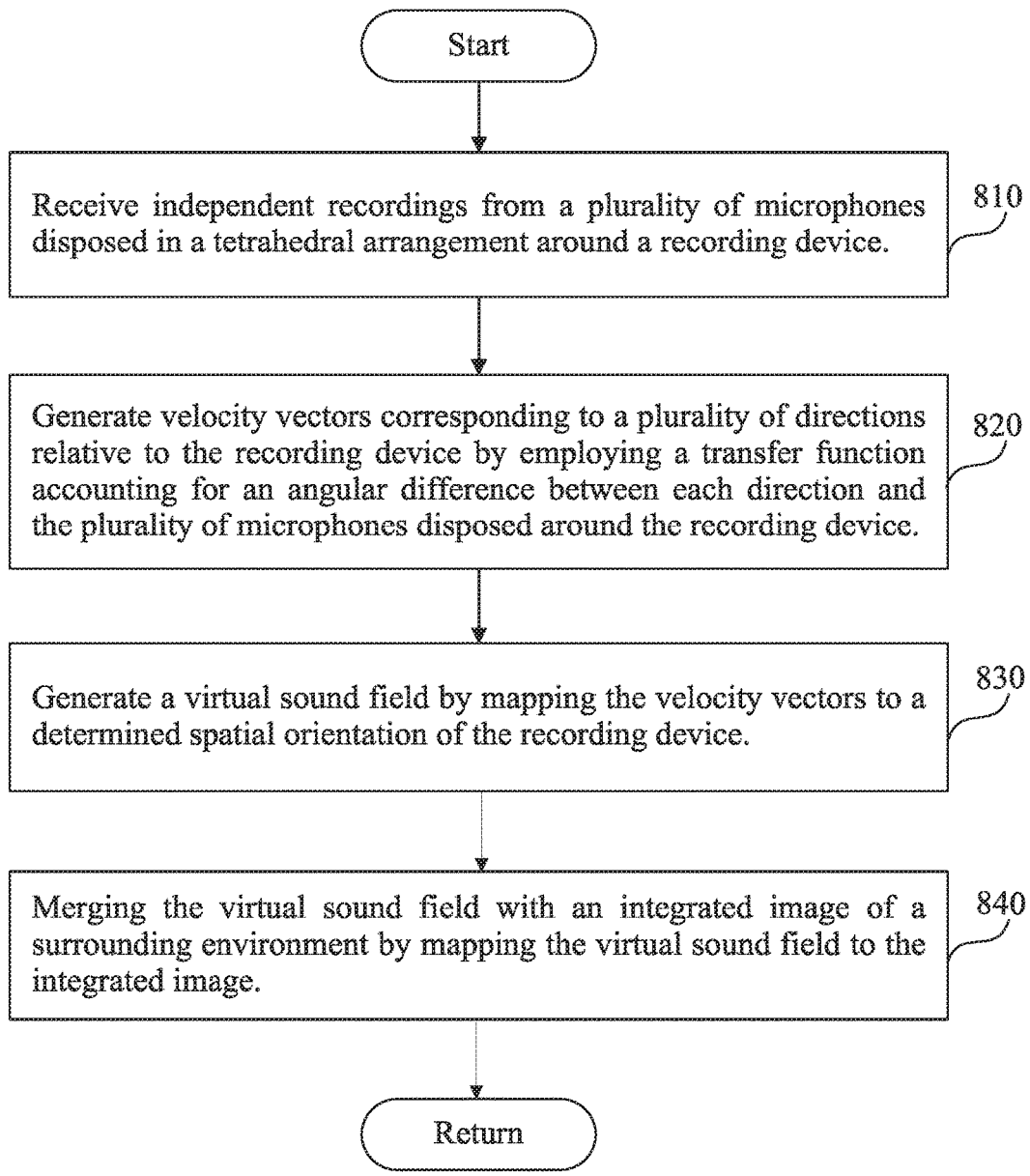
FIG. 8 is a flowchart of a process for generating a virtual sound field, according to an embodiment.

FIG. 8 is a flowchart of a process for generating a virtual sound field, according to an embodiment. The process for generating a virtual sound field can include, for example, receiving independent recordings from a plurality of microphones disposed in a tetrahedral arrangement around a recording device (step 810), generating velocity vectors corresponding to a plurality of directions relative to the recording device by employing a transfer function accounting for an angular difference between each direction and the plurality of microphones disposed around the recording device (step 820), generating a virtual sound field by mapping the velocity vectors to a determined spatial orientation of the recording device (step 830), and merging the virtual sound field with an integrated image of a surrounding environment by mapping the virtual sound field to the integrated image (step 840).

Step 810 includes receiving independent recordings from a plurality of microphones disposed in a tetrahedral arrangement around a recording device. The tetrahedral arrangement enables the microphones to receive sounds from any unobstructed angle in the surrounding environment. Sound recorded by the plurality of microphones consists of independent recordings from each of the plurality of microphones. For example, the independent recordings can include four recordings ($R_{102}$, $R_{104}$, $R_{106}$, and $R_{108}$) from four microphones (e.g., microphone 102, microphone 104, microphone 106, and microphone 108). The sound recordings (e.g., ($R_{102}$, $R_{104}$, $R_{106}$, and $R_{108}$) are associated with a position of a microphone.

In an embodiment, one or more position tracking devices (e.g., an accelerometer, compass, and/or gyroscope) can be used to monitor positions of the microphones. The plurality of microphones can be attached to a mobile device. As the mobile device changes positions, orientation of the plurality of microphones can change. For instance a first microphone can be facing downward and then be shifted to facing upward. Position changes during recording can cause deviations in a virtual sound field if they are not accounted for. Position tracking devices can be used to account for position changes that occur during recording. For instance, if a first microphone initially facing downward is moved to facing upward, a gyroscope can be used to determine the position change. Position data generated by tracking devices corresponding to a particular moment in time is tied to the particular moment in time for each of the recordings. As a position of any of the microphones changes, the position data is updated for the recording generated by the microphones.

Utilizing a plurality of position tracking devices can increase position monitoring accuracy and reduce position tracking drift over time. A compass can monitor position with respect to the Earth's magnetic field to correct deviations in position monitoring that can occur by utilizing an accelerometer and/or gyroscope alone. Since the Earth's magnetic field is relatively stable over long periods of time, the compass can correct position monitoring drift that may occur in other position monitoring devices. A gyroscope and accelerometer can effectively monitor position changes over short time periods which are periodically corrected based on compass data.

Step 820 includes generating velocity vectors corresponding to a plurality of directions relative to the recording device by employing a transfer function accounting for an angular difference between each direction and the plurality of microphones disposed around the recording device. The plurality of independent recordings (e.g., $R_{102}$, $R_{104}$, $R_{106}$, and $R_{108}$) recorded by the plurality of microphones can be used to generate velocity vectors corresponding to a plurality of directions of propagation of the sound. The direction of propagation of sound can be determined based on a known disposition of a microphone relative to other microphones as well as an orientation in space determined based on position data. A sound pressure level (W) at a given point in space as well as three components of a velocity vector (X, Y, and Z) can be determined based on the plurality of independent recordings (e.g., $R_{102}$, $R_{104}$, $R_{106}$, and $R_{108}$) associated with the plurality of microphones (e.g., microphone 102, microphone 104, microphone 106, and microphone 108) having a determined spatial orientation. The plurality of independent recordings (e.g., $R_{102}$, $R_{104}$, $R_{106}$, and $R_{108}$) can be recordings associated with each microphone stored on a non-transitory storage medium or a source sound signal generated by each of the microphones upon receiving a sound input.

Position data includes a disposition of each of the microphones relative to the other microphones as well as data from position tracking devices. Position data can correspond to a moment in time or a period of time. For example, position tracking devices can transmit a periodic update indicative of a position or change in position. A processor analyzes data from the position tracking devices to determine a position of the microphones. In some embodiments, a conflict between data from a first tracking device and a second tracking device can arise. In response to a conflict between position tracking devices, the processor performs a conflict resolution method. The conflict resolution method can include utilizing a tiered tracking device table and/or cross-referencing with data of a third position tracking device. For example, if a conflict arises between a gyroscope and a compass, a processor can review a tiered tracking device table which can indicate that the compass data takes priority over the gyroscope data. The processor can resolve the conflict by providing a higher weight to higher priority data. For example, the processor can apply a weighted value of 0.8 to compass data and 0.2 to gyroscope data. In another example, the processor can omit gyroscope data and rely instead on compass data.

In some embodiments, a conflict can be resolved by analyzing data of a third tracking device. For example, a conflict between compass data and gyroscope data can be resolved by analyzing accelerometer data. For instance, if the accelerometer detected a centrifugal force associated with a rotation which corresponds with a direction indicated by the compass data, the processor can omit the gyroscope data or apply a lower weight (e.g., a 0.1 weighted value) to gyroscope data than compass data.

Step 830 includes generating a virtual sound field by mapping the velocity vectors to a determined spatial orientation of the recording device. Position data is mapped to the plurality of independent recordings (e.g., $R_{102}$, $R_{104}$, $R_{106}$, and $R_{108}$). A first time stamp can be embedded in position data and a second time stamp can be imbedded in each recording. Portions of position data corresponding in time with recording data are mapped to one another. Each recording is associated with a particular orientation indicated in the position data and corresponding to a complementary time stamp. Thus, as a microphone device is moved through space, a relative orientation of each of the microphones is monitored and associated with recordings as the recordings are recorded.

Step 840 includes merging the virtual sound field with an integrated image of a surrounding environment by mapping the virtual sound field to the integrated image. A generated sound field can be mapped to an generated image field of the surrounding environment. The sound field can be generated by capturing sound from the plurality of microphones and determining a sound pressure level and a plurality of velocity vectors having a defined direction. The direction of the velocity vectors can be fixed or fluctuate (e.g., based on a received query). The image field can be generated by correcting image distortions (e.g., from a fisheye camera) and stitching a plurality of undistorted images together (e.g., by identifying an image overlap area of the plurality of images).

The plurality of microphones can be positioned around one or more cameras. For example, a first camera can be disposed in a first direction and a second camera can be disposed in a second direction where the first and second direction are substantially in opposite directions (e.g., approximately 180 degrees apart from one another). Two microphones can be disposed adjacent to each camera where the microphones are disposed in a substantially tetrahedral orientation. Images (e.g., still images and/or video) can include a time stamp which can be mapped to position data. An image field can be generated where images are stitched together based on a correspondence to positions of the surrounding environment. Embodiments for recording and processing images are provided below with respect to FIGS. 9-11.

Methods for Recording and Processing Images

Figure 9:
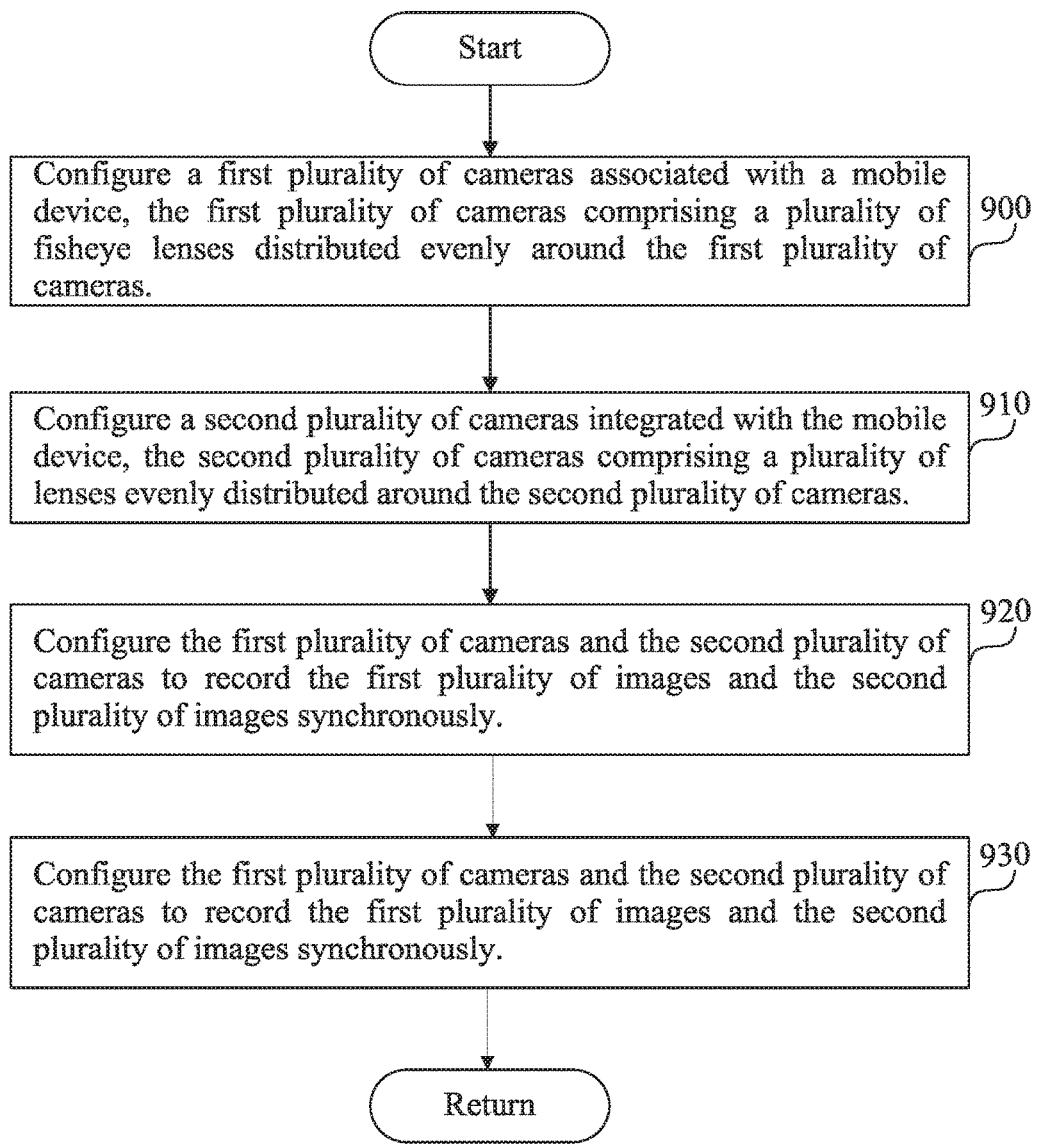
FIG. 9 is a flowchart of a process to record an undistorted wide view of a surrounding environment, according to an embodiment.

FIG. 9 is a flowchart of a process to record an undistorted wide view (e.g., 360° view) of a surrounding environment, according to one embodiment. In step 900, a first plurality of cameras is configured. The first plurality of cameras includes a plurality of fisheye lenses distributed around the first plurality of cameras. The first plurality of cameras is configured to record a first plurality of images associated with the surrounding environment. Each image in the first plurality of images comprises an image periphery distorted by a fisheye lens in the plurality of fisheye lenses, and an image center undistorted by the fisheye lens.

In step 910, a second plurality of cameras is configured. The second plurality of cameras includes a plurality of lenses distributed around the second plurality of cameras. The second plurality of cameras is configured to record a second plurality of images associated with the surrounding environment. Each image in the second plurality of images comprises an image center undistorted by a camera in the second plurality of cameras. The plurality of image centers associated with the second plurality of images overlaps the plurality of image peripheries associated with the first plurality of images.

In step 920, the first plurality of cameras and the second plurality of cameras are configured to record the first plurality of images and the second plurality of images. The images can be recorded synchronously. A timestamp can be included in metadata associated with the images so images having a timestamp within a time span (e.g., a fraction of a second to several seconds) of the timestamp can be associated with a same time during one or more processing steps (e.g., combining images).

In step 930, a processor is configured to combine the first plurality of images and the second plurality of images into an image undistorted by the plurality of fisheye lenses. The combined image can be a wide-view image (e.g., a 360° image) of a surrounding environment.

Figure 10A:
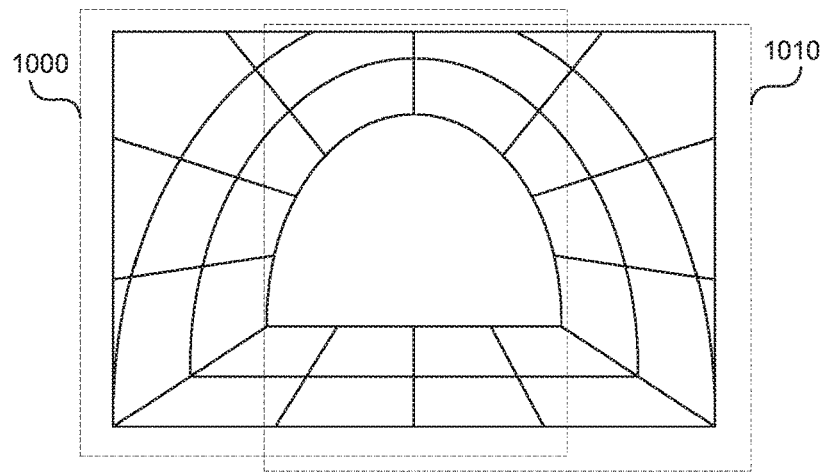
FIG. 10A illustrates an image recorded by a normal lens associated with a second plurality of cameras, according to an embodiment.

FIG. 10A shows an image recorded by a normal lens associated with a second plurality of cameras, according to one embodiment. The image is that of a cobblestone tunnel. The image is undistorted, and shows the environment as a human eye would perceive the environment. The area of the image 1000 overlaps with an image recorded by a wide angle lens in the first plurality of cameras, where the wide angle lens is disposed to the left of the normal lens. The area of the image 1010 overlaps with an image recorded by a wide angle lens in the second plurality of cameras, where the wide angle lens is disposed to the right of the normal lens.

Figure 10B:
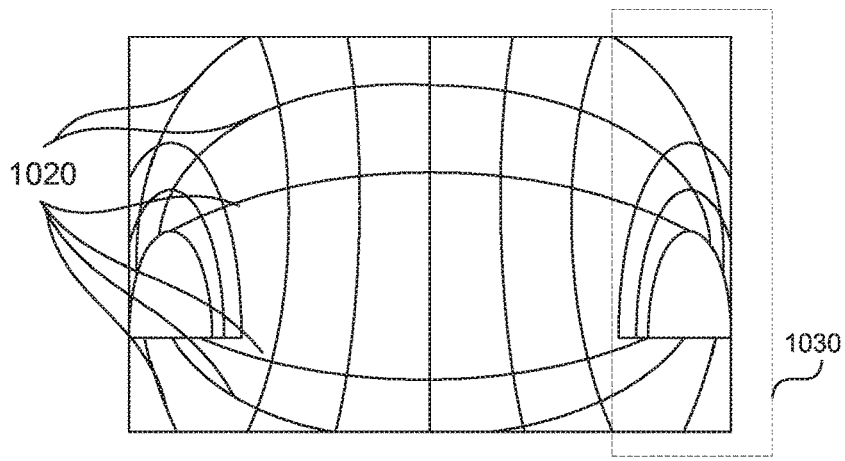
FIG. 10B illustrates an image recorded by a wide angle lens associated with the first plurality of cameras, according to an embodiment.

FIG. 10B shows an image recorded by a wide angle lens associated with the first plurality of cameras, according to one embodiment. The wide angle lens is disposed at 90° with respect to the normal lens from FIG. 10A. Otherwise, the position and orientation of the wide angle lens is the same as the position orientation of the normal lens in FIG. 10A. The image is distorted because straight lines are depicted as curved lines 1020. Area of the image 1010 overlaps with the area of the image 1000 in FIG. 10A.

Figure 10C:
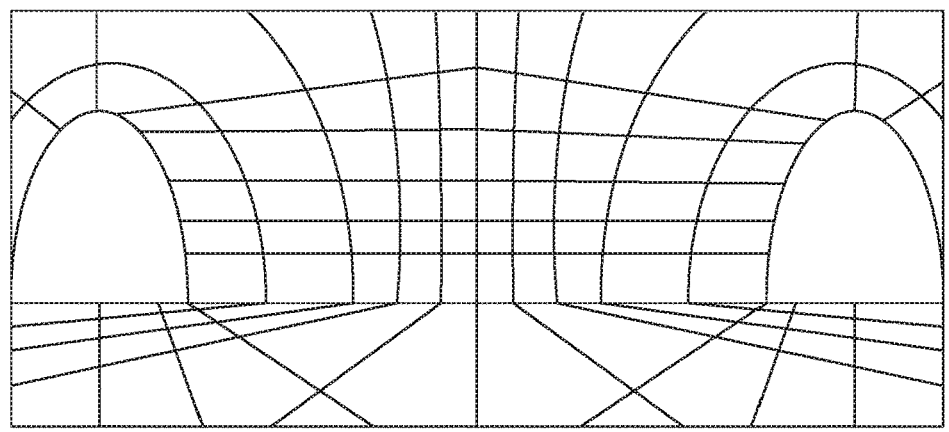
FIG. 10C illustrates an undistorted image obtained by combining images associated with the first plurality of cameras and images associated with the second plurality of cameras, according to an embodiment.

FIG. 10C shows an undistorted image obtained by combining images associated with the first plurality of cameras and images associated with the second plurality of cameras, according to one embodiment. A processor receives images associated with the first plurality of cameras, and images associated with the second plurality of cameras, and combines the images to produce an undistorted image. The image shown is a 180° image associated with a first wide angle lens in the first plurality of cameras. The processor can produce a similar 180° image associated with a second wide angle lens in the first plurality of cameras.

FIG. 10 shows a method for processing a plurality of images, according to several embodiments. A plurality of images can be stitched into a single image (e.g., a single 360° image), according to several embodiments. Embodiments include mapping a first image with a second image based on pattern recognition. Embodiments include calibrating an imaging device to assist in determining an overlap of one or more images. Embodiments include identifying objects of interest in an image (for facilitating, e.g., cropping objects, focusing on objects, defining a region for local dewarping, etc.).

Figure 11:
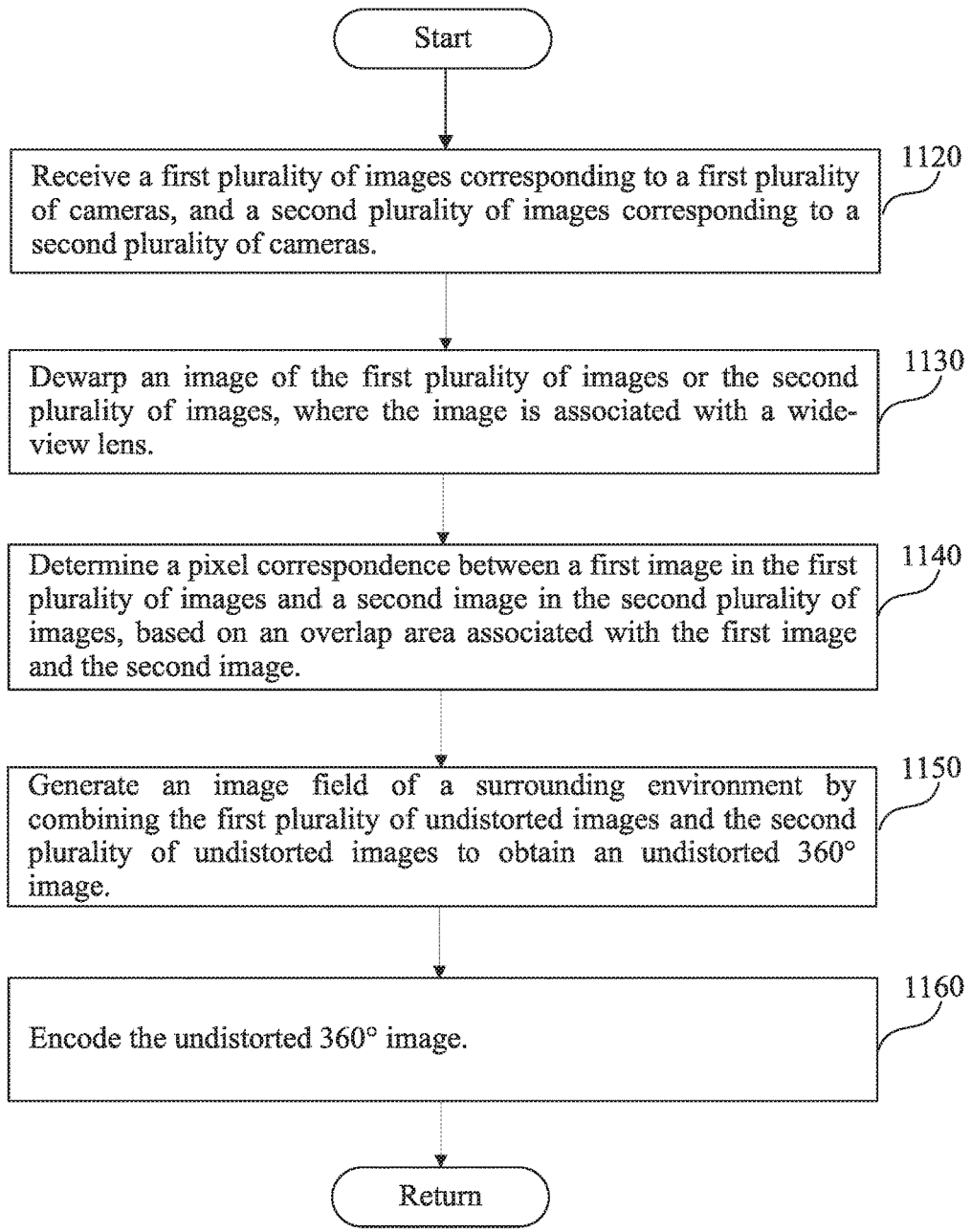
FIG. 11 is a flowchart describing a process for generating an image field of a surrounding environment, according to an embodiment.

FIG. 11 is a flowchart describing a process for stitching a plurality of images into a single image (e.g., a single 360° image), according to one embodiment.

In step 1120, the processor receives a first plurality of images corresponding to a first plurality of cameras, and a second plurality of images corresponding to a second plurality of cameras. In an embodiment, the first plurality of cameras can comprise a plurality of wide angle lenses, where the second plurality of cameras can comprise a plurality of wide angle lenses, and/or can comprise a plurality of normal lenses. The first plurality of cameras and/or the second plurality of cameras may record images having a wide field of view, images having a standard field of view, or a combination thereof. Thus, the first plurality of images and/or the second plurality of images may include images having a wide field of view, images having a standard field of view, or a combination thereof.

In an embodiment, a database may include field of view information for each camera. A processor may retrieve field of view information for each camera and attach the field of view information to a recorded image as metadata. For example, a processor may attach "wide field of view" metadata to an image of the first set of images. In another example, a processor may attach "standard field of view" metadata to an image of the second set of images. The metadata including field of view information can be used to, for example, identify images for dewarping, as described below with reference to step 1030.

In step 1130, the processor can dewarp an image of the first plurality of images or the second plurality of images, according to one embodiment. Dewarping an image may involve generating a perspective corrected field of view from a wide angle image (e.g., an image of the first plurality of images corresponding to the first plurality of cameras). In an embodiment, a dewarped image can be stitched with another image (e.g., another dewarped image, an image associated with a standard lens, or an image associated with a wide-view lens), as discussed below with reference to steps 1140 and 1150.

In an embodiment, the processor can dewarp images including "wide field of view" metadata attached to the images. In an embodiment, the processor may retrieve field of view data from a database to identify which images on which to perform dewarping. In an embodiment, the processor may identify a distortion pattern in one or more objects in an image and perform dewarping on images having a distortion and/or curvature pattern. For example, the processor may identify a bookcase in an image and determine that the bookcase has a curvature increasing with a distance from a center of an image. Based on the curvature pattern of the object (e.g., the bookcase), the processor can determine the image includes a wide field of view and can dewarp the image. In another embodiment, a mapping function associated with any of the wide view cameras can be used to dewarp images captured by a corresponding camera.

In some embodiments, step 1130 can be omitted. Dewarping may reduce image quality, particularly for generating a perspective corrected field of view near an outer edge of a wide-angle image. In embodiments omitting step 1130, image stitching may be performed between images associated with a wide-view lens and another image (e.g., an image associated with a standard lens, or an image associated with a wide-view lens), as discussed below with reference to steps 1140 and 1150.

In step 1140, the processor determines a pixel correspondence between a first plurality of images recorded by the first plurality of cameras, and the second plurality of images recorded by the second plurality of images, for a given relative position of the first and second plurality of cameras. In an embodiment, determining a pixel correspondence may include (1) determining a corresponding overlap area between a first image (e.g., from the first plurality of images) and a second image (e.g., from the second plurality of images) and (2) identifying a correspondence between a set of pixels of the first image to a set of pixels of the second image.

In step 1150, the processor generates an image field of a surrounding environment by combining the first plurality of undistorted images and the second plurality of undistorted images to obtain an undistorted 360° image. Embodiments include combining the first plurality of images and the second plurality of images by, for example, merging corresponding pixels in a corresponding overlap area.

Various embodiments for merging pixels are contemplated. In an embodiment, corresponding pixels may be merged evenly (e.g., an even mix of color, brightness, etc. from a first set of pixels and a second set of pixels). In an another embodiment, corresponding pixels may be merged based on a weighted distortion factor. The weighted distortion factor may be based on an estimated distortion in a location of a pixel. For example, for a fisheye image, a weighted distortion factor may increase an influence of pixels near a center of the fisheye image and decrease an influence of pixels near an outer edge of the fisheye image. A weighted distortion factor may have a rate of change extending from a center of a fisheye image outward. A rate of change of a weighted distortion factor may be, for example, linear, exponential, etc. A rate of change of the weighted distortion may be fixed and assigned to images captured from a camera (e.g., exponential rate of change for images from fisheye cameras) or may be adjustable and updated based on an analysis of a distortion rate for images received from a camera.

In an example, corresponding pixels (e.g., P1 and P2) in the corresponding overlap areas 1030, 1040 in FIG. 10C may be merged. A pixel P1 may be associated with the overlap area 1030 in FIG. 10B and a corresponding pixel P2 may be associated the overlap area 1040 in FIG. 10B. The processor may assign a weighted distortion factor from 0 to 1 for each pixel, so that the sum of weights always equals to one. The processor creates a new pixel P0, which is equal to W1*P1+(1−W1)*P2, where 0<=W1<=1. The weighted distortion factor W1 is determined based on the distance of pixel P1 to an inner edge 1050 associated with the overlap area. When the pixel P1 is right next to the edge 1050, W1 is 1. The weight W1 decreases until W1 reaches 0, at an outer edge 1060. The decrease can be linear, quadratic, cubic, etc., or the decrease can be discreet so that after a specified distance from the edge 1050, the weight W1 becomes 0. The specified distance can be one pixel, two pixels, etc., up to half of the pixels contained in the area 1030.

By merging a first pixel (e.g., P1), or set of first pixels, with a second pixel (e.g., P2), or set of first pixels, a new pixel (e.g., P0), or a set of new pixels, may be generated. The newly generated pixel, or set of pixels, may be used to generate a wide-view image (e.g., a 360° image). For example, corresponding pixels in corresponding overlap areas of a plurality of images (e.g., images recorded from a plurality cameras surrounding a 360° imaging device) can each be merged to generate a continuous undistorted wide-view image (e.g., 360° image).

Further image processing (e.g., image encoding) of a generated wide-view image (e.g., 360° image) is contemplated by some embodiments but may not be required. Possible further processing is described below with reference to step 1160.

In step 1160, image encoding can be performed, for instance, after receiving images (e.g., as in step 1120), after dewarping images (e.g., as in step 1130), after determining pixel correspondence (e.g., as in step 1140), after combining images (e.g., as in step 1150), or following another step. In one embodiment, encoding can be performed on an undistorted 360° image generated by combining a plurality of images. Embodiments include image encoding occurring in response to performance one or more steps, such as, for example, step 1120, step 1130, step 1140, step 1150, or any combination thereof. Image encoding as referred to in step 1160 can include any of compression, encryption, or other alteration of pixels. In an embodiment, image encoding can be performed prior to writing images to an image stream.

In an embodiment, image encoding in step 1160 can include image compression. Image compression can be used to enable more efficient storage and/or transmission of image data. Image compression may be performed using, for example, run-length encoding, area image compression, differential pulse-code modulation, entropy encoding, or any combination thereof. In an embodiment, a processor can be included within a 360° imaging device. The processor can identify redundant image data in a plurality of images recorded by the 360° imaging device. The processor can store redundant image data can as a single data value and insert a reference to the single data value in place of the redundant image data. In an example, as further described with reference to FIG. 19, one or more objects in an image can be detected. The detected object(s) in a plurality of images may include redundant image data. For example, a face may be a detected object in images recorded by the 360° imaging device. A first plurality of images can include the detected face (e.g., recorded by a first camera of the 360° imaging device) and a second plurality of images including the detected face (e.g., recorded by a second camera of the 360° imaging device). The detected face may include identified features stored in a detected objects database. A reference to the detected objects database may be inserted into the image code for the first plurality of images including the detected face and the second plurality of images including the detected face. By referring to the detected objects database rather than including the image code for the detected face, the size of the image data can be reduced.

In an embodiment, image encoding in step 1160 can include image encryption. The image encryption may include, for example, converting plaintext code of an image into cipher text, visual cryptography, or a combination thereof. In some embodiments, image encryption can occur to reduce a likelihood that image information can be retrieved by an unauthorized user. For example, a drone can be equipped with a 360° imaging device having a processor within the 360° imaging device. The processor can encrypt images (e.g., as soon as images are received or as soon as images are combined) and store encrypted images (e.g., 360° images) in a database. In the event that the drone equipped with the 360° imaging device is acquired by an unauthorized user, the encrypted images can be much more difficult to view than standard images. Thus, encryption of images recorded by a 360° imaging device can reduce a likelihood of revealing sensitive image information.

In an embodiment, image data may be encrypted by converting plaintext code of an image into cipher text. Image data can be a matrix consisting of an RGBA (Red Green Blue Alpha) color space. Each pixel in the matrix can include a color value and an alpha value. If image compression is performed, reference values may be substituted in place of one or more portions of an image. The reference values may refer to one or more reference tables (e.g., a detected objects database). The reference values can be provided as plaintext code. A processor may convert the reference values into cipher text, making one or more portions (e.g., a detected object referenced in an image) unviewable without deciphering the cipher text. In an embodiment, detected objects in an image can be objects associated with a significant portion of an image. For example, a detected object can be a face in an image. By encrypting references to detected objects, significant portions of an image (e.g., a face in an image) may be rendered unviewable without deciphering the cipher text.

In an embodiment, image data may be encrypted by using visual cryptography. Visual cryptography may be performed by splitting an image into separate portions and retaining a reference indicating which separate portions to unify to regenerate the image. Visual cryptography can be performed electronically by separating portions (e.g., checkerboard, scattered sequence of pixels, or other unique shapes) of image data (e.g., the RGBA color space) and identifying a reunification method. For example, an original image can be split into a first checkerboard portion of the RGBA color space and a second checkerboard portion of the RGBA color space. The first checkerboard portion of the RGBA color space may be stored in a first database, and the second checkerboard portion of the RGBA color space may be stored in a second database. A reference may be generated indicating a file in the first database and a file in the second database associated with the original image. The reference may be plaintext code. The reference may be converted into cipher text, thus making the original image difficult to view without deciphering the cipher text.

Figure 12:
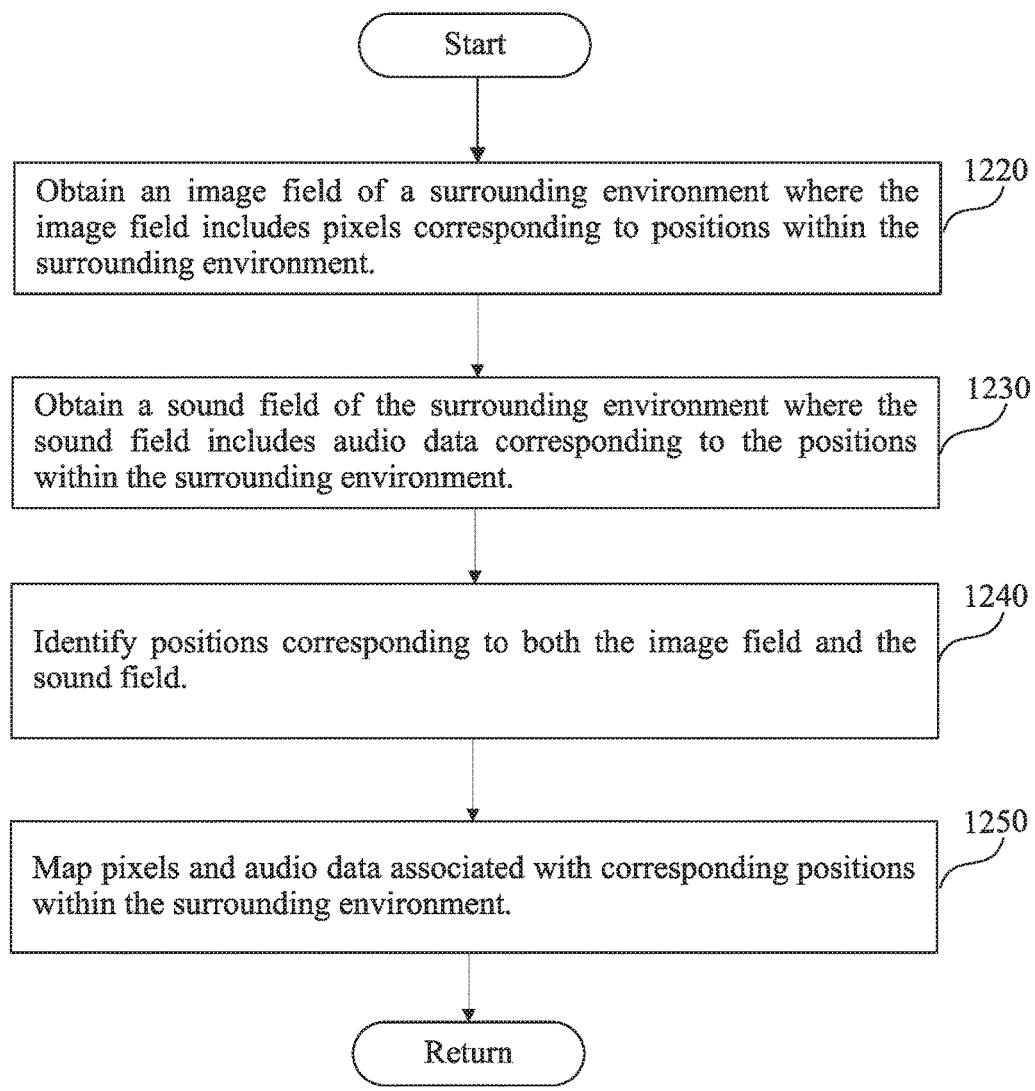
FIG. 12 is a flowchart describing a process for mapping a generated image field with a generated sound field.

FIG. 12 is a flowchart describing a process for mapping a generated image field with a generated sound field. The process can include, for example, obtaining an image field of a surrounding environment where the image field includes pixels corresponding to positions within the surrounding environment (step 1220), obtaining a sound field of the surrounding environment where the sound field includes audio data corresponding to the positions within the surrounding environment (step 1230), identifying positions corresponding to both the image field and the sound field (step 1240), and mapping pixels and audio data associated with corresponding positions within the surrounding environment (step 1250).

In step 1220, the processor can obtain an image field of a surrounding environment where the image field includes pixels corresponding to positions within the surrounding environment. For example, the processor can obtain the image field generated in step 1150. The obtained image field can include one or more encodings as described in step 1160. The image field can be obtained in real time (e.g., as it is being generated). The image field can be retrieved from an image field database. The image field database can be a storage space in a storage medium of a mobile device, accessory (e.g., attachable camera, headphone, etc.), or combination thereof.

In step 1230, the processor can obtain a sound field of the surrounding environment where the sound field includes audio data corresponding to the positions within the surrounding environment. For example, the processor can obtain a sound field generated in step 830. The sound field can be obtained in real time (e.g., as it is being generated). The sound field can be retrieved from a sound field database. The sound field database can be a storage space in a storage medium of a mobile device, accessory, (e.g., attachable microphone, headphone, etc.), or combination thereof In an embodiment, a hybrid image/sound field database can store both an image field and a sound field. The hybrid database can include associations between the image field and the sound field. Positions of correspondence between the image field and the sound field can be determined, as described below in step 1240.

In step 1240, the processor can identify positions corresponding to both the image field and the sound field. For example, the image field and sound field can be mapped together based on spatial orientation associations and time stamp associations. Pixels of the image field corresponding to a first position and a first time stamp can be associated with sound data of the sound field corresponding to a second position and a second time stamp. The first and second positions and first and second time stamps can be determined to have a correspondence in excess of a pre-determined threshold (e.g., at least 99% correspondence). In an embodiment, the pre-determined correspondence threshold can enable a correspondence high enough such that playback of images and sound of the mapped image and sound fields appear natural to a human observer.

In step 1250, the processor can map pixels and audio data associated with corresponding positions within the surrounding environment. Corresponding positions within the surrounding environment include positions of an image field and positions of a sound field having a correspondence exceeding a pre-determined threshold (e.g., at least 99% correspondence). The processor can map pixels and audio data associated with corresponding time. Corresponding time includes time stamps of an image field and time stamps of a sound field having a correspondence exceeding a pre-determined threshold (e.g., at least 99% correspondence).

In some embodiments, the pre-determined threshold for position correspondence can be the same as the pre-determined threshold for time correspondence. In some embodiments, the pre-determined threshold for position correspondence is not the same as the pre-determined threshold for time correspondence. For example, the pre-determined threshold for position correspondence can be based on a minimum number of pixel and audio associations requisite for generating substantially fluid playback. In an example, the pre-determined threshold for time correspondence can be based on a maximum time differential that is undetectable to a human observer (e.g., less than a time differential of approximately 8 to 16 milliseconds).

Figure 13:
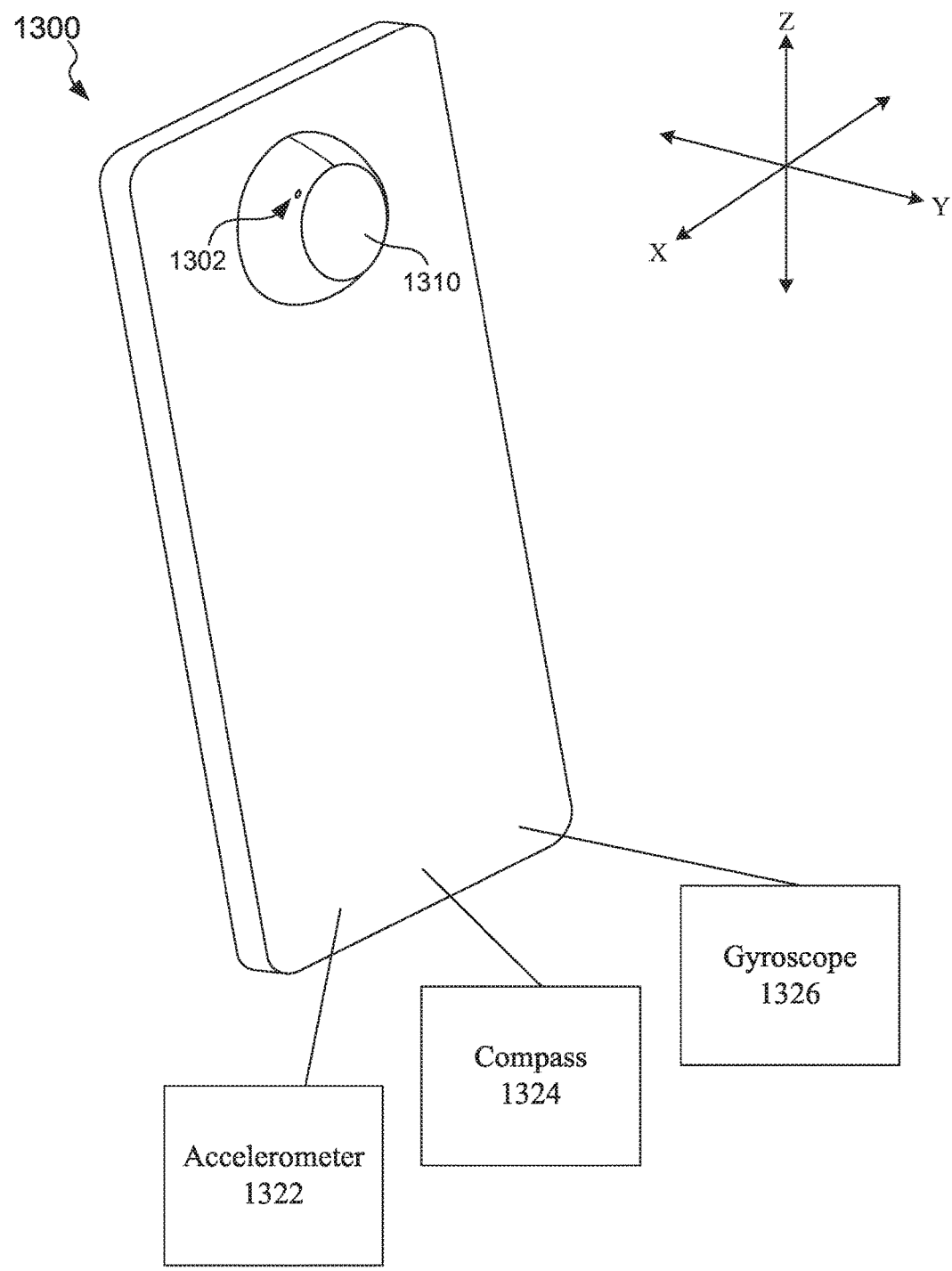
FIG. 13 illustrates a mobile device in a spatial orientation, according to an embodiment.

FIG. 13 illustrates a mobile device 1300 in a spatial orientation, according to an embodiment. The mobile device 1300 can include one or more microphones (e.g., microphone 1302), one or more cameras (e.g., camera 1310), an accelerometer 1322, a compass 1324, and a gyroscope 1326. In an embodiment, the mobile device 1300 can include four microphones in a tetrahedral arrangement where two microphones are disposed adjacent to cameras on opposite sides of the mobile device 1300. For example, two microphones (e.g., microphone 1302 and another microphone on a lower right side) can be adjacent to camera 1310 and two microphones (e.g., on an upper right side and a lower left side) can be adjacent to another camera opposite of camera 1310.

A spatial orientation of the mobile device 1300 can be monitored as images and sound are recorded by the cameras and microphones. For example, the accelerometer 1322, compass 1324, and gyroscope 1326 can monitor the spatial orientation of the mobile device 1300. The accelerometer 1322 can measure acceleration (or rate of change of velocity) of a body in its own instantaneous rest frame. A processor generates position data based on the monitored spatial orientation of the mobile device 1300. The position data includes a series of time stamps corresponding to an orientation of the mobile phone 1300 and location within a space. The orientation of the mobile phone 1300 relates to an angular position relative to a detected gravitational acceleration toward Earth. A location within a space can include a geographic location (e.g., monitored by a Global Positioning System device), a location within a room (e.g., monitored by changes in acceleration and orientation relative to a gravitational force and/or a detected magnetic north), a location within an open space (e.g., a park or sport field), a location within a town or city, or any combination thereof. Images and sounds captured can be mapped to position data and associated with a particular point and orientation in space.

The accelerometer 1322 can convert the mechanical motion into an electrical signal. The accelerometer 1322 can include a piezoelectric component, a piezoresistive component, a capacitive component, or any combination thereof. The accelerometer 1322 can include piezoceramics (e.g. lead zirconate titanate) or single crystals (e.g. quartz, tourmaline, etc.). The accelerometer 1322 can be configured to function in a high upper frequency range and a high temperature range. The accelerometer 1322 can function in high shock applications. The accelerometer 1322 can include a silicon micro-machined sensing element. The accelerometer 1322 can function in a low frequency range. The accelerometer 1322 can operate in servo mode to achieve high stability and linearity.

The accelerometer 1322 can include small micro electromechanical systems (MEMS). The accelerometer 1322 can include a cantilever beam with a proof mass (e.g., a seismic mass). Residual gas sealed in the accelerometer 1322 can result in damping. The accelerometer 1322 can be configured to have a quality factor ("Q-factor") above a threshold. A Q-factor is a dimensionless parameter that describes how under-damped an oscillator or resonator is, and characterizes a resonator's bandwidth relative to its center frequency. The Q-factor threshold can ensure that damping does not result in lower sensitivity.

Under the influence of external accelerations the proof mass deflects from its neutral position. This deflection is measured in an analog or digital manner. For example, the capacitance between a set of fixed beams and a set of beams attached to the proof mass is measured. The accelerometer 1322 can include piezoresistors integrated into springs to detect spring deformation. The accelerometer 1322 can utilize quantum tunneling. Quantum tunneling can improve acceleration detection sensitivity. A dedicated processor can be used to analyze data from a quantum tunneling accelerometer. Data output from a quantum tunneling accelerometer may be significant. Utilizing a dedicated processor for the significant data output can enable real time analysis of acute acceleration measurements.

A plurality of accelerometers can be used. Linear detection accelerometers can be oriented in a plurality of directions (e.g., perpendicular to one another along two or more axis). Accelerometers having various levels of sensitivities can be used. For example, an ultra-sensitive accelerometer (e.g., a quantum accelerometer) can be used in combination with an accelerometer having a higher measuring range (e.g., a cantilever beam accelerometer). By using combinations of accelerometers having a first sensitivity range and another sensitivity range, greater ranges of accelerations can be detected.

The compass 1324 can include a conventional needle point compass, gyrocompass, solid state compass (e.g., including a magnetometer), or any combination thereof. A solid state compass can include two or more magnetic field sensors that provide data for a microprocessor. The solid state compass can be a discrete component which outputs either a digital or analog signal proportional to its orientation. This signal can interpreted by a controller or microprocessor and either used internally, or sent to an external processing unit. The sensor uses highly calibrated internal electronics to measure the response of the device relative to the Earth's magnetic field.

The gyroscope 1326 can include a mechanical gyroscope (e.g., including a spinning wheel or disc), microelectromechanical systems (MEMS) gyroscope, a solid-state ring laser, a fiber optic gyroscope, a quantum gyroscope, or any combination thereof. An axis of rotation of a component of the gyroscope 1326 can be free to assume any orientation by itself. When rotating, the orientation of this axis is unaffected by tilting or rotation of the mounting due to the conservation of angular momentum. A MEMS gyroscope can include lithographically constructed versions of one or more of a tuning fork, a vibrating wheel, a resonant solid, or any combination thereof. The MEMS gyroscope can include gyroscopic sensors for multiple axes. The MEMS gyroscope can provide an analog and/or digital output indicative of measurements from any of the gyroscopic sensors corresponding to any of the multiple axes. A quantum gyroscope can be extremely sensitive in measuring orientation changes. Combinations of gyroscopes having various sensitivity ranges can be included to increase a range of orientation measurements that can be accurately taken. For example, a quantum gyroscope can be used in combination with a MEMS gyroscope.

Figure 14A:
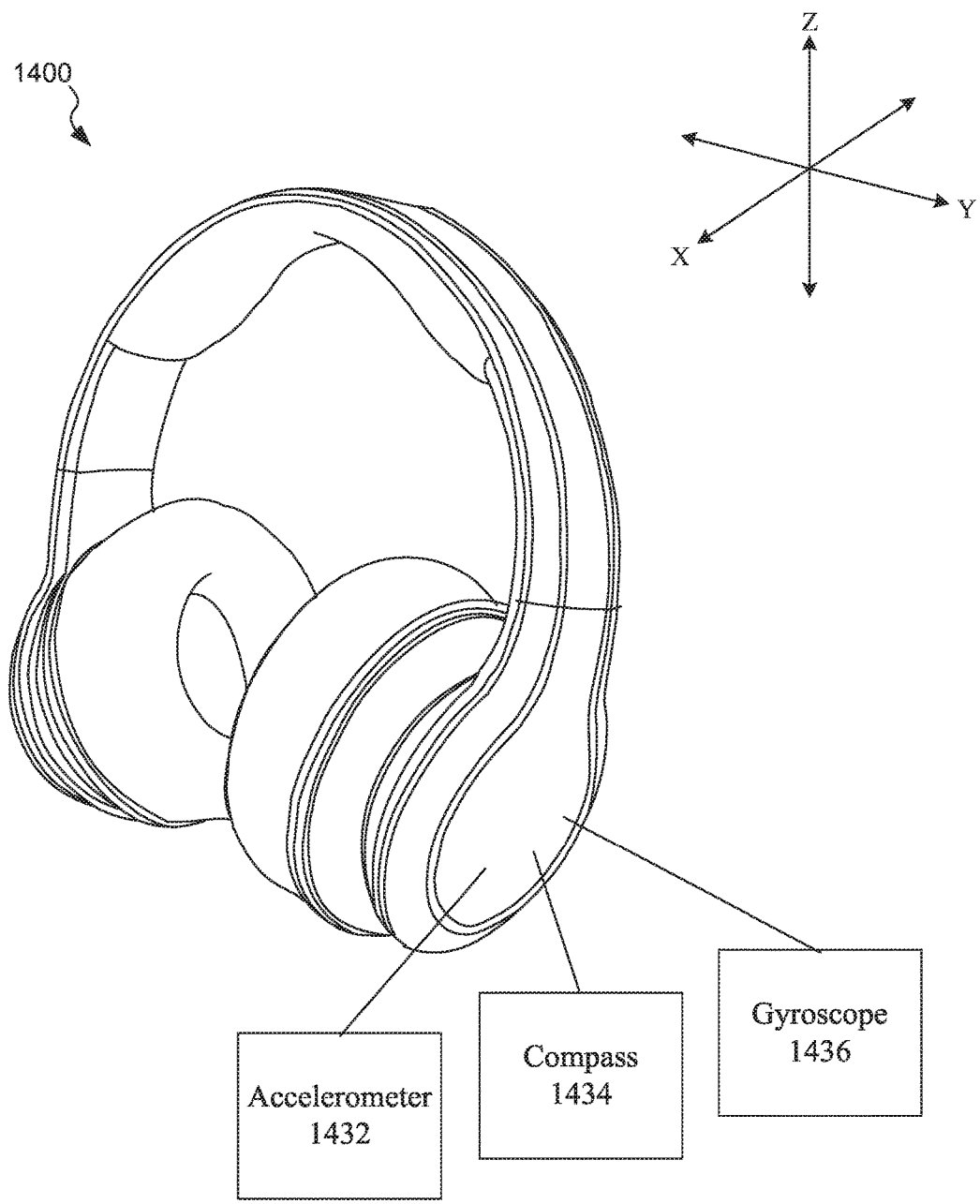
FIGS. 14A-14C illustrates a headphone in a spatial orientation, according to an embodiment.
Figure 14B:
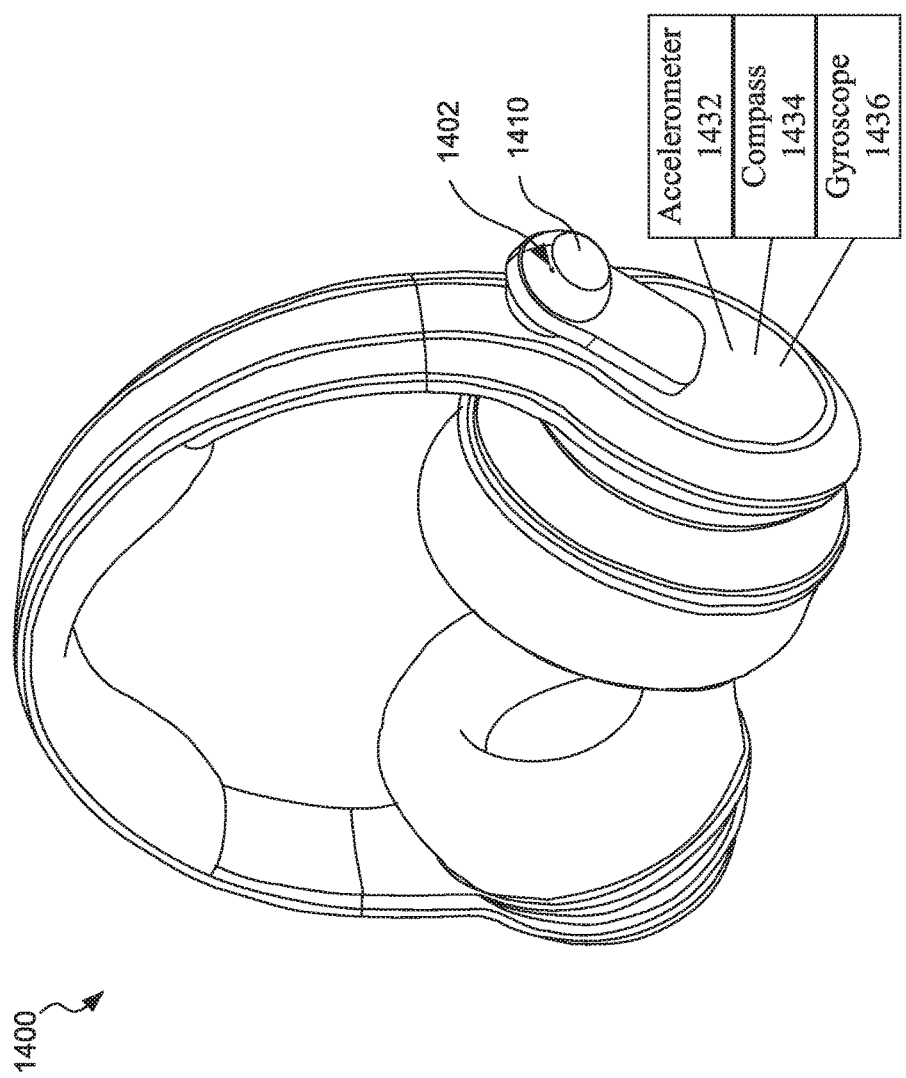
Figure 14C:
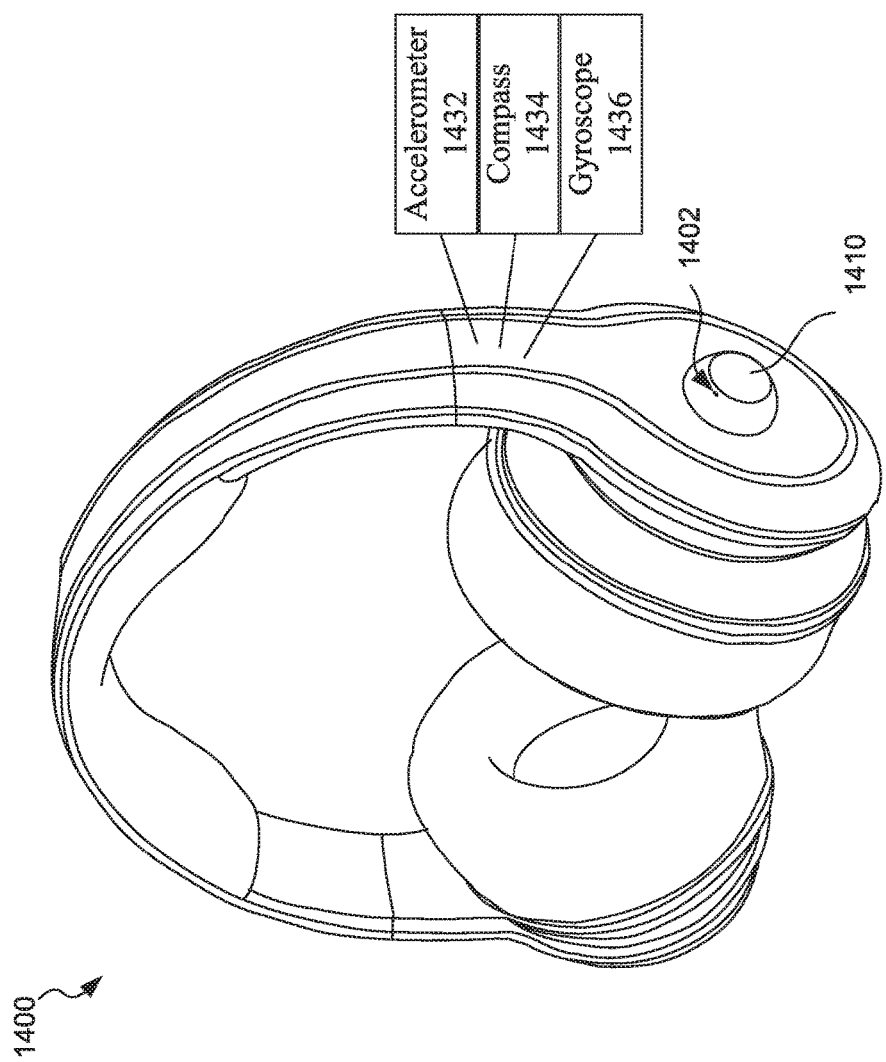

FIGS. 14A-14C illustrate a headphone 1400 monitoring a spatial orientation and capturing images and/or audio data, according to an embodiment.

FIG. 14A illustrates a headphone 1400 including position monitoring devices, according to an embodiment. The headphone 1400 can include a plurality of position monitoring devices including, for example, an accelerometer 1432 (e.g., accelerometer 1322), a compass 1434 (e.g., compass 1324), and a gyroscope 1436 (e.g., gyroscope 1326). The headphone 1400 can include one or more microphones (not shown) and one or more cameras (not shown).

A spatial orientation of the headphone 1400 can be monitored as images and sound are recorded by the cameras and microphones. For example, the accelerometer 1432, compass 1434, and gyroscope 1436 can monitor the spatial orientation of the headphone 1400. The accelerometer 1432 can measure acceleration (or rate of change of velocity) of a body in its own instantaneous rest frame. A processor generates position data based on the monitored spatial orientation of the headphone 1400. The position data includes a series of time stamps corresponding to an orientation of the headphone 1400 and location within a space. The orientation of the headphone 1400 relates to an angular position relative to a detected gravitational acceleration toward Earth. A location within a space can include a geographic location (e.g., monitored by a Global Positioning System device), a location within a room (e.g., monitored by changes in acceleration and orientation relative to a gravitational force and/or a detected magnetic north), a location within an open space (e.g., a park or sport field), a location within a town or city, or any combination thereof. Images and sounds captured can be mapped to position data and associated with a particular point and orientation in space.

FIG. 14B shows a headphone 1400 configured to receive a microphone device (e.g., including a camera 1410 and a microphone 1402). The headphone 1400 can include an attachment mechanism for securing the microphone device to the headphone 1400. The attachment mechanism can include, for example, a magnet, a clip, a threaded fastener, a snap fastener, a clasp, a clamp, a pin, a grommet, a detachable rivet, a hook and look fastener, or any combination thereof. One fastener combination can include one or more magnetic rivets insertable into an opening of the headphone 1400. The one or more magnetic rivets can be decoupled by applying a force to the accessory greater than the magnetic force holding the accessory in the one or more openings of the headphone 1400.

The headphone 1400 can be configured to receive one or more microphone devices via one or more attachment mechanisms. For example, an attachment mechanism can be located on an outer surface of each side of the headphone opposite of a speaker element of the headphone. A first microphone device can attach to a first side of the headphone 1400 opposite of a first speaker element, and a second microphone device can attach to a second side of the headphone 1400 opposite of a second speaker element. The first and second microphone device can include at least one camera facing outward away from the headphone 1400 and at least two microphones facing outward away from the headphone 1400. The first and second microphone devices can include additional camera(s) and/or microphone(s) facing inward toward the headphone. The processor can determine that the camera(s) and/or microphone(s) are inward facing by, for example, (1) associating camera(s) and/or microphone(s) corresponding to a side of an attachment mechanism of the microphone device as inward facing, (2) detect an obstruction associated with the headphone 1400 in audio and/or image data received from the camera(s) and/or microphone(s), (3) or a combination thereof. A processor can disregard data received from inward facing camera(s) and/or microphone(s). The processor can use audio and/or image data received from outward facing camera(s) and/or microphone(s) attached to a first and/or second side of the headphone 1400.

FIG. 14C shows a headphone 1400 having an integrated camera 1410 and microphone 1402. The headphone 1400 can include four microphones in a tetrahedral arrangement where two microphones are disposed adjacent to cameras on opposite sides of the headphone 1400. For example, two microphones (e.g., microphone 1402 and another microphone on a lower right side) can be adjacent to camera 1410 and two microphones (e.g., on an upper right side and a lower left side) can be adjacent to another camera on an opposite side of the headphone 1430 as camera 1410.

Figure 15A:
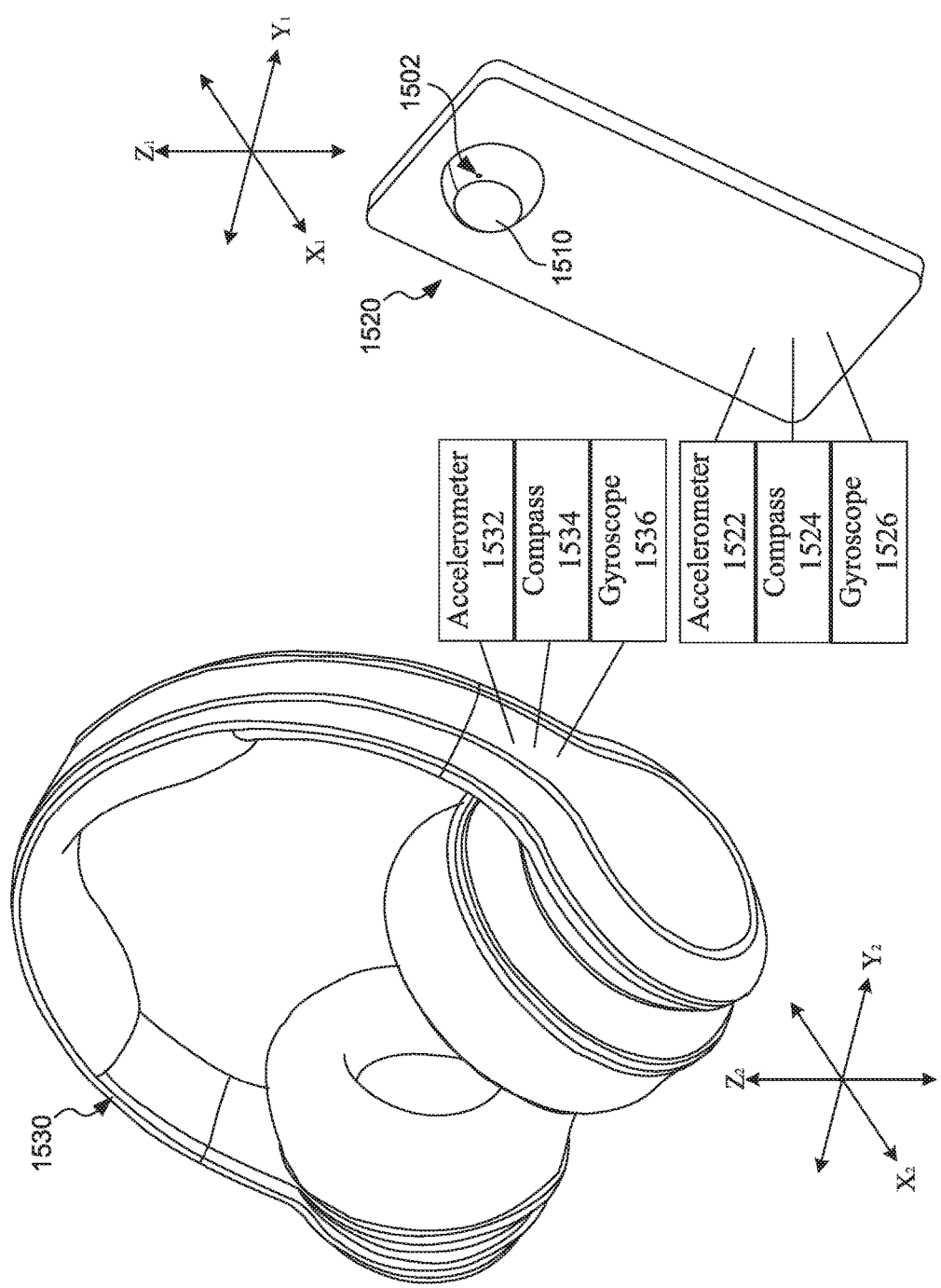
FIG. 15A-15B illustrate a mobile device in a first spatial orientation and a headphone in a second orientation, according to an embodiment.
Figure 15B:
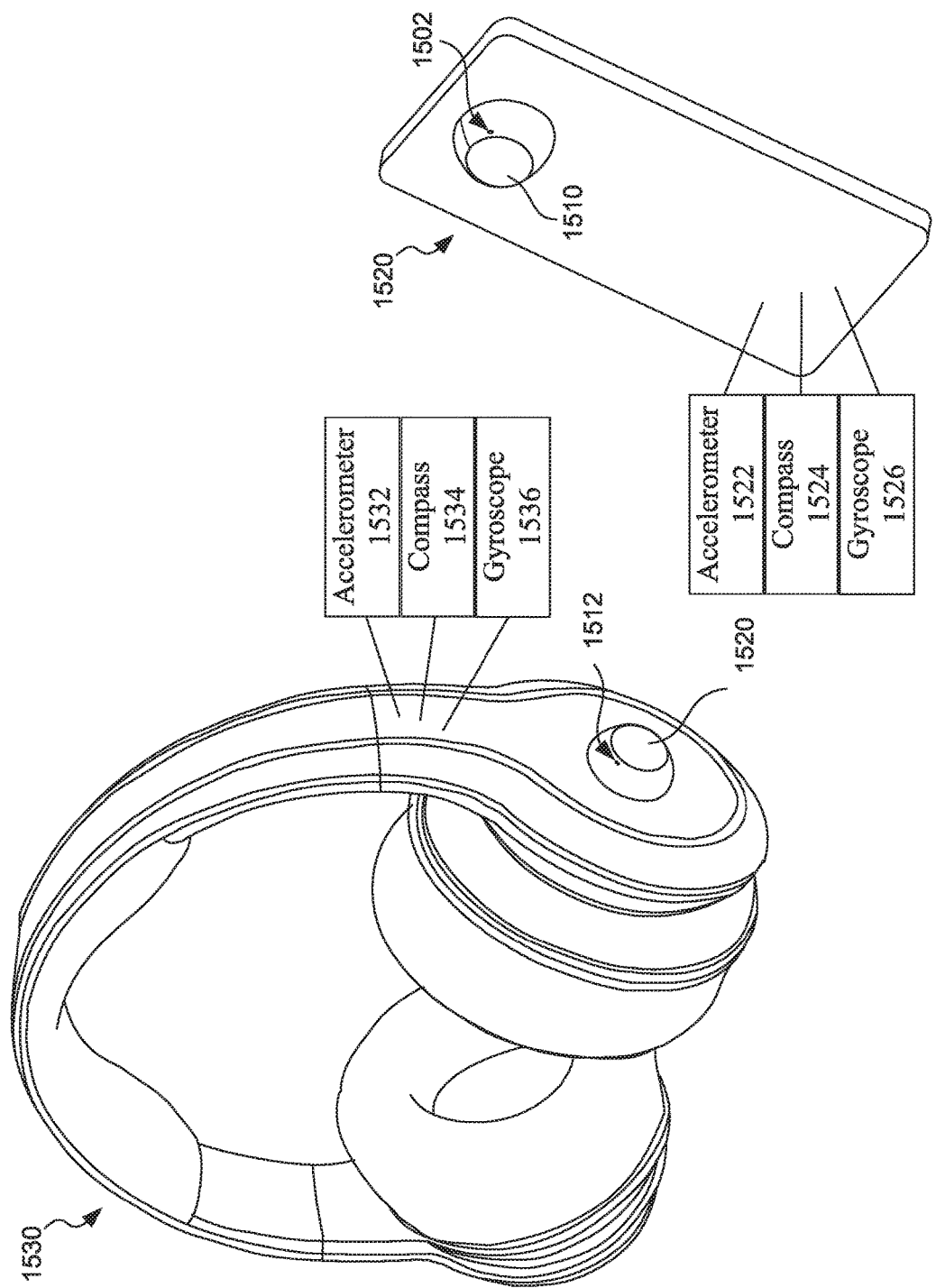

FIG. 15A-15B illustrates a mobile device in a first spatial orientation and a headphone in a second orientation, according to an embodiment. FIG. 15A shows a headphone 1530 and a mobile device 1520. The mobile device includes an integrated camera/microphone device (e.g., including microphone 1502 and camera 1510). FIG. 15B shows the headphone 1530 having an integrated camera/microphone device (e.g., including microphone 1512 and camera 1510).

The headphone 1530 and mobile device 1520 both include spatial orientation monitoring instruments. The headphone 1530 can include a plurality of position monitoring devices including, for example, an accelerometer 1532 (e.g., accelerometer 1322), a compass 1534 (e.g., compass 1324), and a gyroscope 1536 (e.g., gyroscope 1326). The mobile device 1520 can include a plurality of position monitoring devices including, for example, an accelerometer 1522 (e.g., accelerometer 1322), a compass 1524 (e.g., compass 1324), and a gyroscope 1526 (e.g., gyroscope 1326). The spatial orientation monitoring instruments among the headphone 1530 and mobile device 1520 can be coordinated. A processor (e.g., a processor of the headphone 1530 and/or the mobile device 1520) can identify divergences in measurements between the special orientation monitoring instruments. Coordinated accelerometers can be used to measure differences in proper acceleration over their separation in space. At any point in spacetime, the equivalence principle guarantees the existence of a local inertial frame, and the accelerometer measures the acceleration relative to that frame. Single and multi-axis models of accelerometers can be used to detect magnitude and direction of the proper acceleration, as a vector quantity, and can be used to sense orientation (because direction of weight changes), coordinate acceleration, vibration, shock, and falling in a resistive medium (e.g., where the proper acceleration changes, since it starts at zero, then increases).

Figure 16:
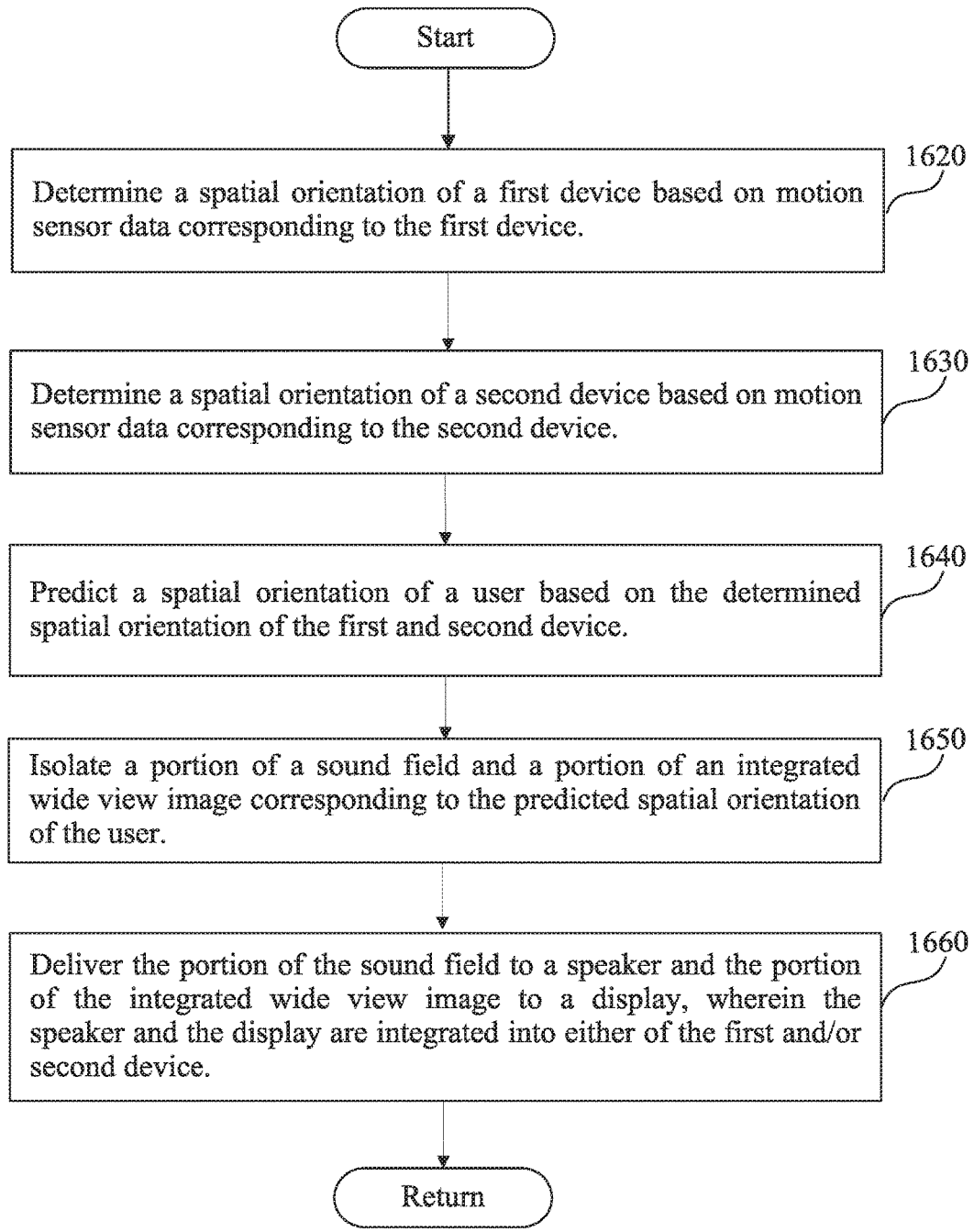
FIG. 16 is a flowchart describing a process for isolating portions of a virtual sound field, according to one embodiment.

FIG. 16 is a flowchart describing a process for isolating portions of a virtual sound field, according to one embodiment. The process can include, for example, determining a spatial orientation of a first device based on motion sensor data corresponding to the first device (step 1620), determining a spatial orientation of a second device based on motion sensor data corresponding to the second device (step 1630), predicting a spatial orientation of a user based on the determined spatial orientation of the first and second device (step 1640), isolating a portion of a sound field and a portion of an integrated wide view image corresponding to the predicted spatial orientation of the user (step 1650), and delivering the portion of the sound field to a speaker and the portion of the integrated wide view image to a display, wherein the speaker and the display are integrated into either of the first and/or second device (step 1660).

Step 1620 can involve determining a spatial orientation of a first device based on motion sensor data corresponding to the first device. The spatial orientation of the first device can be monitored as images and sound are recorded by one or more cameras and/or microphones of either of the first or second device. For example, an accelerometer, compass, and/or gyroscope can monitor the spatial orientation of the first device. The accelerometer can measure acceleration (or rate of change of velocity) of a body in its own instantaneous rest frame. A processor generates position data based on the monitored spatial orientation of the mobile device. The position data includes a detected orientation of the first device corresponding to a series of time stamps.

The accelerometer can include a proof mass configured to deform a spring. Deformations of the spring can be detected and used to determine an orientation of the first device. Under the influence of external accelerations the proof mass deflects from its neutral position. This deflection is measured in an analog or digital manner. For example, the capacitance between a set of fixed beams and a set of beams attached to the proof mass is measured. The accelerometer can include one or more proof masses attached to a spring oriented in one or more directions. For example, the accelerometer can include three proof masses attached to three springs oriented in three directions. The three directions can be associated with X, Y, and Z axes. An acceleration detected in one or more directions is used to determine an direction of an acceleration relative to the axes. In an example, multiple accelerometers can be oriented in a same or similar direction. A first accelerometer having a first orientation (e.g., X-axis oriented) can be located adjacent to a first side of the first device (e.g., near the top of the device) and a second accelerometer having a second orientation (e.g., X-axis oriented) can be located adjacent to a second side of the first device (e.g., near the bottom of the device). A processor determines a deviation between acceleration of the first and second accelerometer. The processor uses the determined deviation to calculate torque applied to the first device which is associated with rotational motion.

The accelerometer can include piezoresistors integrated into springs to detect spring deformation. The accelerometer can utilize quantum tunneling. Quantum tunneling can improve acceleration detection sensitivity. A dedicated processor can be used to analyze data from a quantum tunneling accelerometer. Data output from a quantum tunneling accelerometer may be significant. Utilizing a dedicated processor for the significant data output can enable real time analysis of acute acceleration measurements.

In an embodiment, the spatial orientation of the first device can be determined based on images captured from one or more cameras on the first and/or second device. For example, an object can be detected in an image captured from the first device. The detected object can move from a first position in a first image to a second position in a second image (e.g., from left to right) indicating that the first device is moving in an opposite direction as the object (e.g., from right to left). A processor can detect a plurality of objects in the first and second images to substantiate a determination above a threshold probability that the first device is moving in an opposite direction as any of the plurality of objects. If a first object is determined to be moving in a first direction and a second object is determined to be moving in a second direction, a tie breaking protocol can be executed. The tie breaking protocol can involve detecting a plurality of additional objects in the images. The first device can be determined to be moving in an opposite direction as, for example, a majority (e.g., greater than ½) or super majority (e.g., greater than ⅔ or ¾) of the additional objects.

Step 1630 can involve determining a spatial orientation of a second device based on motion sensor data corresponding to the second device. One or more motion sensors (e.g., accelerometer, compass, and/or gyroscope) can detect motion data. For example, an accelerometer, compass, and/or gyroscope can monitor the spatial orientation of the second device. The motion data can be detected concurrently with recording of images and sound by one or more cameras and/or microphones of either of the first or second device. An accelerometer can measure acceleration (or rate of change of velocity) of a body in its own instantaneous rest frame. A processor generates position data based on the monitored spatial orientation of the mobile device. The position data includes a detected orientation of the second device corresponding to a series of time stamps.

In an embodiment, the spatial orientation of the second device can be determined based on images captured from one or more cameras on the first and/or second device. For example, an object can be detected in an image captured from the second device. The detected object can move from a first position in a first image to a second position in a second image (e.g., from left to right) indicating that the second device is moving in an opposite direction as the object (e.g., from right to left). A processor can detect a plurality of objects in the first and second images to substantiate a determination above a threshold probability that the second device is moving in an opposite direction as any of the plurality of objects. If a first object is determined to be moving in a first direction and a second object is determined to be moving in a second direction, a tie breaking protocol can be executed. The tie breaking protocol can involve detecting a plurality of additional objects in the images. The second device can be determined to be moving in an opposite direction as, for example, a majority (e.g., greater than ½) or super majority (e.g., greater than ⅔ or ¾) of the additional objects.

Step 1640 can involve predicting a spatial orientation of a user based on the determined spatial orientation of the first and second device. Relative positions of the first and second device can be used to predict the spatial orientation of the user. Relative positions of the first and second devices can be determined based on the determined spatial orientation of the first and second devices.

In an example, a first device can be a mobile phone and a second device can be headphones. The mobile device can be determined to be held in a user's hand, for example, based on a determined spatial orientation, as a default setting, upon detecting a finger on a touch surface, upon detecting a proximity to a surface (e.g., a surface corresponding to a user) using an infrared sensor, upon detecting a pressure applied to the mobile phone, upon activation of the mobile phone, or any combination thereof. The headphone can be determined to be worn by the user, for example, based on determined spatial orientation, as a default setting, upon detecting a proximity to a surface (e.g., a surface corresponding to a user) using an infrared sensor, upon detecting a pressure applied to a headphone, upon activation of the headphone, or any combination thereof The spatial orientation of a user determined to be holding the first device in a hand and wearing a second device proximate to one or more ears can be determined based on the determined spatial orientation of the first and second devices. A determined orientation relative to the first and second device can vary if the first device is turned away from the second device (e.g., if a user turns his/her head away from a mobile phone). Varied orientation of the first and second device can impact a portion of the sound field and/or integrated wide view image isolated for the user, as further described below with respect to step 1650.

Step 1650 can involve isolating a portion of a sound field and a portion of an integrated wide view image corresponding to the predicted spatial orientation of the user. A processor can predict that a user is oriented in a first position based on an alignment among a determined orientation of the first and second devices. An alignment can be determined if a first device is oriented perpendicular to a second device. For example, a first device (e.g., a mobile phone) can be predicted to be facing toward a front portion of a user's face and the second device (e.g., a headphone) can be predicted to be adjacent to either side of a user's face (e.g., in or on a user's ear).

Step 1660 can involve delivering the portion of the sound field to a speaker and the portion of the integrated wide view image to a display. The speaker and the display can be integrated into either of the first and/or second device. For example, the first device can include a display and the second device can include a speaker. In another example, the first device can include a display and a speaker and the second device can include a speaker. In another example, the first and second devices can both include a display and a speaker.

A device among the first and second devices is selected for delivery of the portion of the sound field. Selecting the device for delivery can involve identifying one or more functionalities of the device. Identifying the one or more functionalities of the device can involve analyzing data retrieved from a device library. The device library can include data indicative of device function. For example, a processor can query the device library associated with each of the first and second devices for data indicative of a speaker protocol. The processor can receive data from the device libraries associated with each of the first and second devices. If the processor determines that neither device includes speaker functionality, the processor may not deliver the portion of the sound field to either device. If the processor determines that one of the two device (e.g., the second device) includes speaker functionality, the processor can deliver the portion of the sound field to the device determined to have speaker functionality. If the received data is indicative of speaker function for each of the first and second devices, a tie breaker procedure is performed. The tie breaker procedure can include (1) determining if either device is a headphone, (2) if either device is determined to be a headphone, determining if the headphone is worn by the user (e.g., by utilizing an infrared or pressure sensor), and (3) if the headphone is determined to be worn by the user, selecting the headphone as the device for delivery of the portion of the sound field.

A device among the first and second devices is selected for delivery of the portion of the integrated wide view image. Selecting the device for delivery can involve identifying one or more functionalities of the device. Identifying the one or more functionalities of the device can involve analyzing data retrieved from a device library. The device library can include data indicative of device function. For example, a processor can query the device library associated with each of the first and second devices for data indicative of a display protocol. The processor can receive data from the device libraries associated with each of the first and second devices. If the processor determines that neither device includes display functionality, the processor may not deliver the portion of the integrated wide view image to either device. If the processor determines that one of the two device (e.g., the first device) includes display functionality, the processor can deliver the portion of the integrated wide view image to the device determined to have display functionality. If the received data is indicative of display function for each of the first and second devices, a tie breaker procedure is performed. In an embodiment, the tie breaker procedure can include (1) determining if either device is a mobile phone, (2) if either device is determined to be a mobile phone, determining if the mobile phone is held by the user (e.g., by utilizing an infrared or pressure sensor), and (3) if the mobile phone is determined to be held by the user, selecting the mobile phone as the device for delivery of the portion of the integrated wide view image. In an embodiment, the tie breaker procedure can include (1) determining if either device is a hands free display (e.g., an automobile display, glasses display, etc.), (2) if either device is determined to be a hands free display, determining if the hands free display is oriented toward the user (e.g., by utilizing a determined orientation), and (3) if the hands free display is determined to be oriented toward the user, selecting the hands free display as the device for delivery of the portion of the integrated wide view image.

Computer

Figure 17:
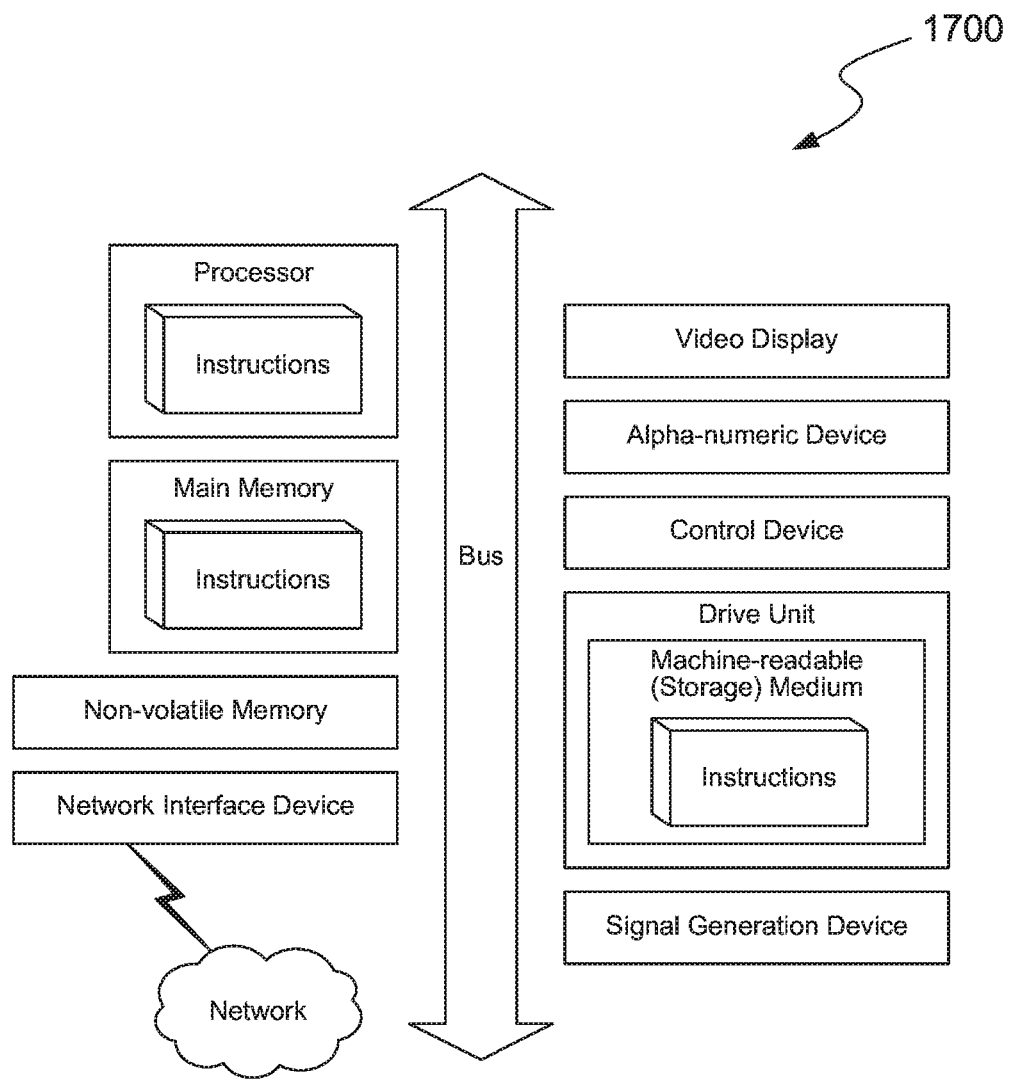
FIG. 17 is a diagrammatic representation of a computer system within which the above-described apparatus may be implemented, and within which a set of instructions for causing the machine to perform any one or more of the methodologies or modules discussed herein may be executed.

FIG. 17 is a diagrammatic representation of a machine in the example form of a computer system 1700 within which a set of instructions, for causing the machine to perform any one or more of the methodologies or modules discussed herein, may be executed.

In the example of FIG. 17, the computer system 1700 includes a processor, memory, non-volatile memory, and an interface device. Various common components (e.g., cache memory) are omitted for illustrative simplicity. The computer system 1700 is intended to illustrate a hardware device on which any of the components described in the example of FIGS. 1-16 (and any other components described in this specification) can be implemented. The computer system 1700 can be of any applicable known or convenient type. The components of the computer system 1700 can be coupled together via a bus or through some other known or convenient device.

This disclosure contemplates the computer system 1700 taking any suitable physical form. As example and not by way of limitation, computer system 1700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1700 may include one or more computer systems 1700; be unitary or distributed; span multiple locations; span multiple machines; or reside in a cloud, which may include one or more cloud components in one or more networks. Where appropriate, one or more computer systems 1700 may perform without substantial spatial or temporal limitation one or more steps of one or more methods described or illustrated herein. As an example and not by way of limitation, one or more computer systems 1700 may perform in real time or in batch mode one or more steps of one or more methods described or illustrated herein. One or more computer systems 1700 may perform at different times or at different locations one or more steps of one or more methods described or illustrated herein, where appropriate.

The processor may be, for example, a conventional microprocessor such as an Intel Pentium microprocessor or Motorola PowerPC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 1700. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1700. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 20 reside in the interface.

In operation, the computer system 1700 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

What is claimed is:

1. A method comprising:
   receiving independent recordings from a plurality of microphones disposed in a tetrahedral arrangement around a recording device;
   generating a virtual sound field by mapping velocity vectors to a determined spatial orientation of the recording device, wherein the velocity vectors are generated by employing a transfer function accounting for an angular difference between each direction and the plurality of microphones disposed around the recording device;
   merging the virtual sound field with an integrated image of a surrounding environment by mapping the virtual sound field to the integrated image; and
   isolating a portion of the virtual sound field and a portion of the integrated image corresponding to a predicted spatial orientation of a user.

2. The method of claim 1, wherein the plurality of microphones include at least one omnidirectional microphone.

3. The method of claim 1, wherein a portion of at least one omnidirectional microphone is acoustically shielded by an acoustic insulator and/or an acoustic reflector.

4. The method of claim 1, wherein the determined spatial orientation of the recording device is determined based on motion sensor data.

5. The method of claim 4, wherein the motion sensor data is received from any of an accelerometer, a compass, and a gyroscope.

6. The method of claim 5, wherein the accelerometer comprises a piezoelectric component, a piezoresistive component, a capacitive component, or any combination thereof.

7. The method of claim 5, wherein the gyroscope comprises a mechanical gyroscope, a microelectromechanical system gyroscope, a solid-state ring laser, a fiber optic gyroscope, a quantum gyroscope, or any combination thereof.

8. The method of claim 1, wherein the integrated image of the surrounding environment is generated by:
   determining a pixel correspondence between a first image among a first plurality of images and a second image among a second plurality of images, based on a corresponding overlap area associated with the first image and the second image; and
   combining the first image and the second image having the pixel correspondence.

9. The method of claim 8, wherein the said determining the pixel correspondence comprises:
   identifying a plurality of overlap areas associated with the first image among the first plurality of images and the second image among the second plurality of images;
   calculating a plurality of first match scores corresponding to the plurality of overlap areas;
   identifying an overlap area of the plurality of overlap areas having a highest first match score of the plurality of first match scores as the corresponding overlap area;
   identifying one or more first set of pixels in the corresponding overlap area of the first image and one or more second set of pixels in the corresponding overlap area of the second image;
   calculating a plurality of second match scores corresponding to the one or more first set of pixels and the one or more second set of pixels; and
   identifying the one or more first set of pixels and the one or more second set of pixels having a highest second match score of the plurality of second match scores as corresponding pixels.

10. The method of claim 8, wherein said combining the first plurality of images and the second plurality of images comprises:
    merging corresponding pixels in the corresponding overlap area, said merging comprising:
    for each pixel in the first image associated with the corresponding overlap area, assigning a first weight ranging from 0 to 1 inclusive, and wherein the first weight is associated with a determined distortion of a pixel in the first image; and
    for each corresponding pixel in the second image associated with the corresponding overlap area, weighing the pixel by a second weight, wherein the second weight increases as the first weight decreases;
    wherein the first weight and the second weight dictate a proportional contribution of each pixel to values of a merged pixel; and
    tiling the first image, the second image, and the corresponding overlap area to obtain a 360° image.

11. The method of claim 1, further comprising:
    a first camera and a second camera disposed on the recording device.

12. The method of claim 11, wherein at least one microphone among the plurality of microphones is disposed adjacent to each of the first camera and the second camera.

13. The method of claim 1, wherein the velocity vectors correspond to a plurality of directions relative to the recording device.

14. The method of claim 1, wherein a direction corresponding with each of the velocity vectors is determined based on the determined spatial orientation of the recording device.

15. The method of claim 1, further comprising:
    receiving a play request associated with the virtual sound field; and
    in response to the play request, identifying a portion of the virtual sound field corresponding to a current spatial orientation of the user.

16. The method of claim 1, further comprising:
    predicting a position of the user based on a determined spatial orientation of one or more devices; and
    iteratively updating a portion of the virtual sound field corresponding to a current spatial orientation of the user.

17. The method of claim 1, further comprising:
    transmitting the portion of the virtual sound field to a speaker and the portion of the integrated image to a display to cause the speaker and the display to synchronize playback.

* * * * *